Jan. 3, 1967 C. H. CLARK ET AL 3,296,369

COMMUNICATIONS EQUIPMENT KEYBOARD

Original Filed April 3, 1962 14 Sheets-Sheet 1

INVENTORS
CLAYTON H. CLARK
DONALD J. STEFANIK

BY Strauch, Nolan, Neale, Nies & Bronaugh
ATTORNEYS

COMMUNICATIONS EQUIPMENT KEYBOARD

Original Filed April 3, 1962 14 Sheets-Sheet 2

INVENTORS
CLAYTON H. CLARK
DONALD J. STEFANIK
BY
Strauch, Nolan, Neale, Nies & Bronaugh
ATTORNEYS

COMMUNICATIONS EQUIPMENT KEYBOARD

Original Filed April 3, 1962 14 Sheets-Sheet 3

INVENTORS

CLAYTON H. CLARK

DONALD J. STEFANIK

BY Strauch, Nolan, Neale, Nies & Bronaugh

ATTORNEYS

INVENTORS
CLAYTON H. CLARK
DONALD J. STEFANIK

BY Strauch, Nolan, Neale, Nies & Bronaugh
ATTORNEYS

COMPONENTS NOT ON MODE PANEL ARE SHOWN FOR REFERENCE ONLY.
MODE PANEL RELAY COILS ARE 500 OHMS.
P/O INDICATES "PART OF"

INVENTORS
CLAYTON H. CLARK
DONALD J. STEFANIK

BY Strauch, Nolan, Neale, Nies & Bronaugh
ATTORNEYS

COMMUNICATIONS EQUIPMENT KEYBOARD

Original Filed April 3, 1962 14 Sheets-Sheet 6

INVENTORS
CLAYTON H. CLARK
DONALD J. STEFANIK

Strauch, Nolan, Neale, Nies & Bronaugh ATTORNEYS

COMMUNICATIONS EQUIPMENT KEYBOARD

Original Filed April 3, 1962 14 Sheets-Sheet 7

INVENTORS
CLAYTON H. CLARK
DONALD J. STEFANIK
BY
Strauch, Nolan, Neale, Nies & Bronaugh
ATTORNEYS INVENTORS
CLAYTON H. CLARK
DONALD J. STEFANIK
BY Strauch, Nolan, Neale, Nies & Bronaugh
ATTORNEYS

INVENTORS
CLAYTON H. CLARK
DONALD J. STEFANIK

BY Strauch, Nolan, Neale, Nies & Bronaugh
ATTORNEYS

INVENTORS
CLAYTON H. CLARK
DONALD J. STEFANIK
BY
Strauch, Nolan, Neale, Nies & Bronaugh
ATTORNEYS

COMMUNICATIONS EQUIPMENT KEYBOARD

Original Filed April 3, 1962 14 Sheets-Sheet 11

INVENTORS
CLAYTON H. CLARK
DONALD J. STEFANIK

BY Strauch, Nolan, Neale, Nies & Bronaugh
ATTORNEYS

COMMUNICATIONS EQUIPMENT KEYBOARD

Original Filed April 3, 1962

INVENTORS
CLAYTON H. CLARK
DONALD J. STEFANIK

BY

Strauch, Nolan, Neale, Nies & Bronaugh
ATTORNEYS

COMMUNICATIONS EQUIPMENT KEYBOARD

INVENTORS
CLAYTON H. CLARK
DONALD J. STEFANIK
BY
Strauch, Nolan, Neale, Nies & Bronaugh
ATTORNEYS

INVENTORS
CLAYTON H. CLARK
DONALD J. STEFANIK

BY Strauch, Nolan, Neale, Nies & Bronaugh
ATTORNEYS 3,296,369

COMMUNICATIONS EQUIPMENT KEYBOARD

Clayton H. Clark, Mundelein, and Donald J. Stefanik, Berwyn, Ill., assignors to SCM Corporation, New York, N.Y., a corporation of New York Original application Apr. 3, 1962, Ser. No. 184,820. Divided and this application Aug. 23, 1965, Ser. No. 481,797

18 Claims. (Cl. 178—17)

This invention relates to a communications equipment keyboard primarily intended for use in telegraphic communication, although it may be adapted for use with other data processing applications. It particularly relates to an encoding keyboard. This application is a division of co-pending application Serial No. 184,820, filed April 3, 1962.

This equipment was developed to serve a telegraphic station use which require two or more interconnected teletypewriter sets with provision for utilizing simultaneous sending and receiving.

Various new concepts of mechanism and operation are incorporated in a small keyboard having keys arranged with standard typewriter spacing and construction in a weatherproof manner to the maximum feasible extent.

Accordingly, a primary object resides in the provision of a novel complete encoding keyboard transmitter unit.

A further object resides in the provision of a novel weatherproofed keyboard construction.

A further object resides in providing a novel keyboard structure in which the keyboard is arranged, and cooperates with the keyboard cover structure to provide a weatherproof unit, without adverse effect on key operation.

Still another object resides in the provision of a novel mechanical keyboard structure in which the key plates (for convenience hereinafter, the multiple leg, key plates may be referred to as key levers, although in a true technical sense they are not levers) are obtained from identical basic stampings, enabling reduced manufacturing and replacement costs.

A still further object resides in the provision of a novel mechanical keyboard structure in which the key levers operate a group of pivoted two-position code bails having no neutral position, the angular position of each code bail constituting one of two signals in each bit of a multiple bit signal combination and transferring such mechanical positioning by means of code bail actuated switches into an electrical switching code combination.

In connection with the preceding object, it is a further object to provide a novel magnetically operated reed switch for each code bail to accomplish the code transfer from a mechanical to an electrical condition.

In further conjunction with these objects it is also a further object to provide in the keyboard unit, novel electronics which enables the keyboard to generate both a parallel signal and a start-stop serial signal representative of the selected keyboard character or function.

Still another object resides in providing a novel mechanical-electronic keyboard unit including controls for setting the operational mode of a keyboard-printer-recorder set enabling various input-output connections and holding such selected mode condition together with a visual indication of the applicable mode of operation currently in progress.

A still further object resides in providing a novel keyboard encoder in which the selected key causes selective, magnetically actuated operation of permutated group of a plurality of glass enclosed reed contact switches, and after a minute mechanical delay causes a sixth U-bail magnetically actuated reed contact switch to close to provide a readout of the encoded signal to associated keyboard electronics which electronically block repeated transmission of the same signal if a key is maintained depressed.

In conjunction with the preceding object it is a further object to provide a novel automatic electronic control permitting a two character typing burst, which exceeds a permitted line transmission rate, this operation being accomplished through a mechanical keyboard lock mechanism which holds the second of the two-character burst in mechanical storage in the keyboard code bails until the first selected character has been transmitted through the electronic circuitry.

Still another object in conjunction with the preceding two objects resides in providing a repeat key mechanism on the keyboard structure, operating through the keyboard electronics to by-pass the electronic repeat blocking and to permit repeated transmission of any character whose associated key is held down while the repeat key is held down.

Further novel features and other objects of this invention will become apparent from the following detailed description, discussion and the appended claims taken in conjunction with the accompanying drawings showing a complete set utilizing the keyboard, the keyboard, subcomponent structures, electronics and embodiments, in which:

Figure 1:
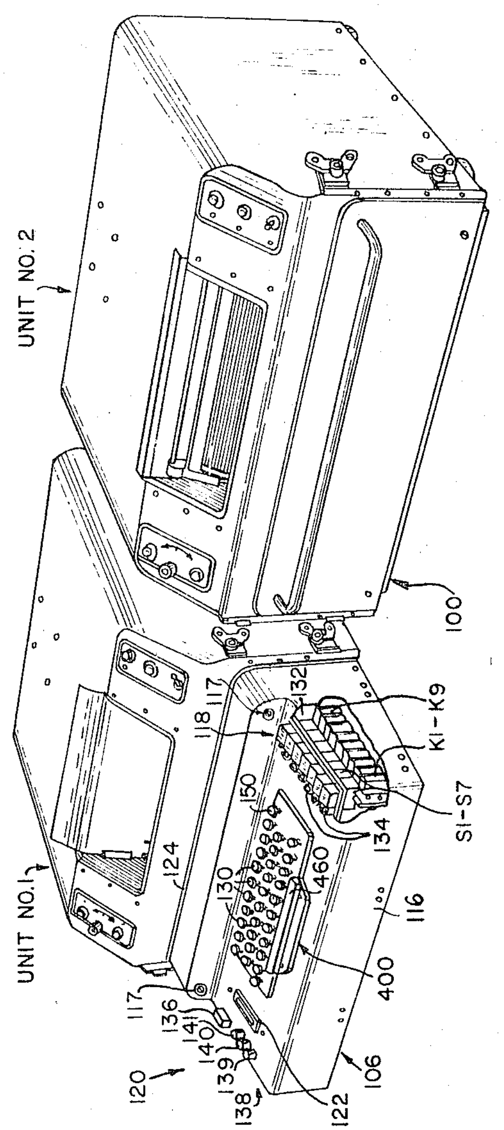
FIGURE 1 is a perspective view of a teletypewriter set with a Unit 1 on the left including a keyboard constructed in accord with the present invention.
Figure 7:
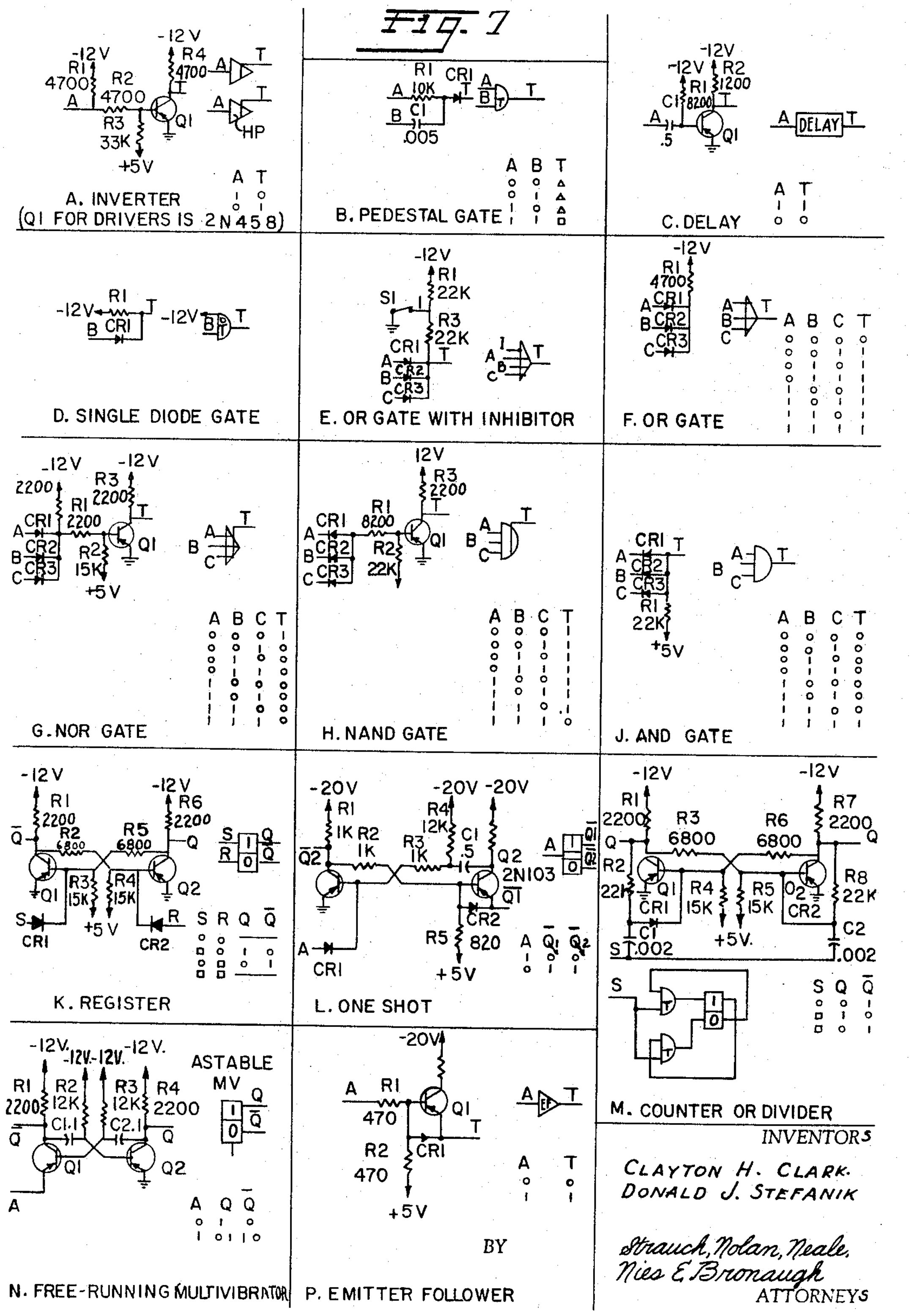
Figure 8A:
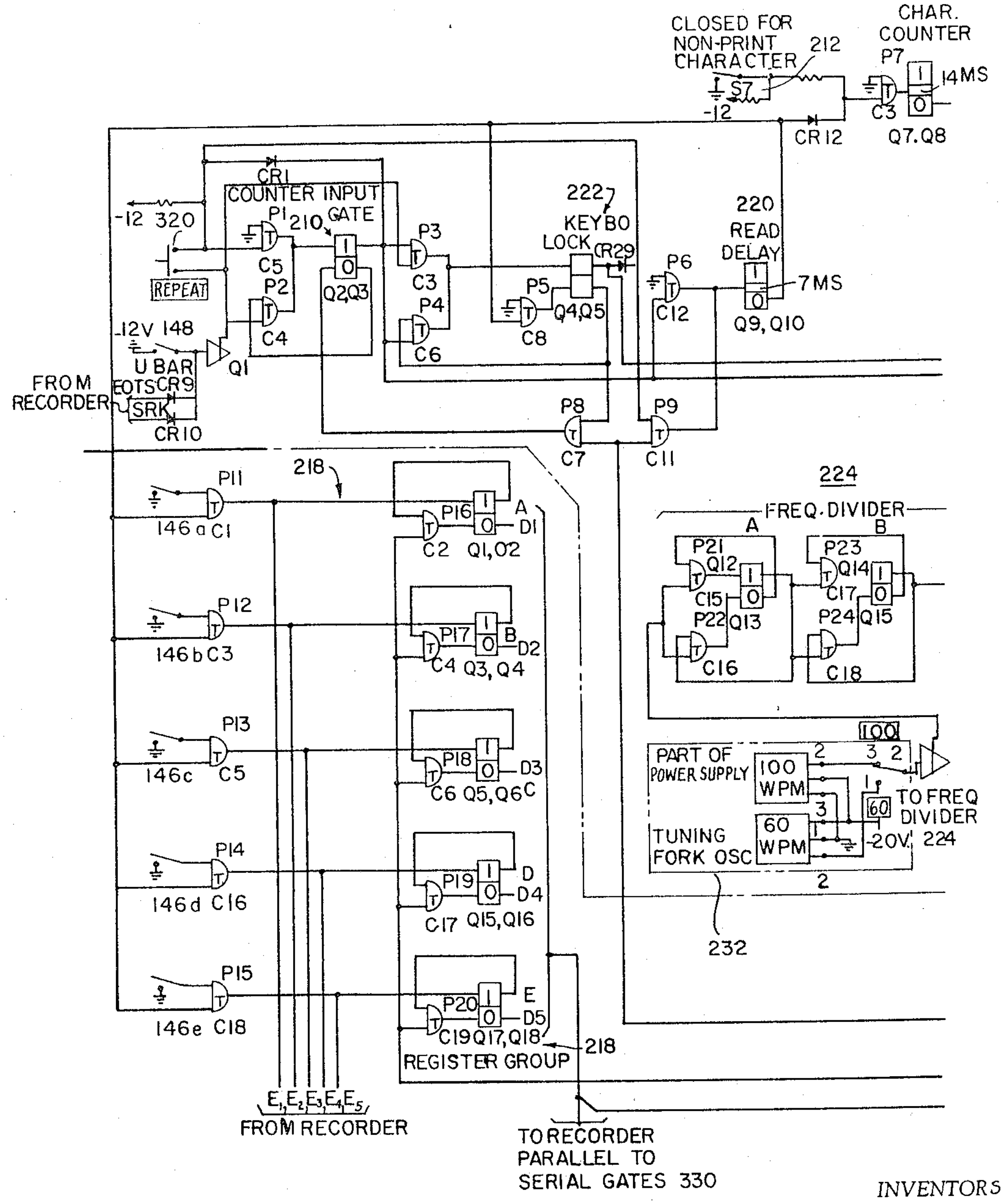
Figure 8B:
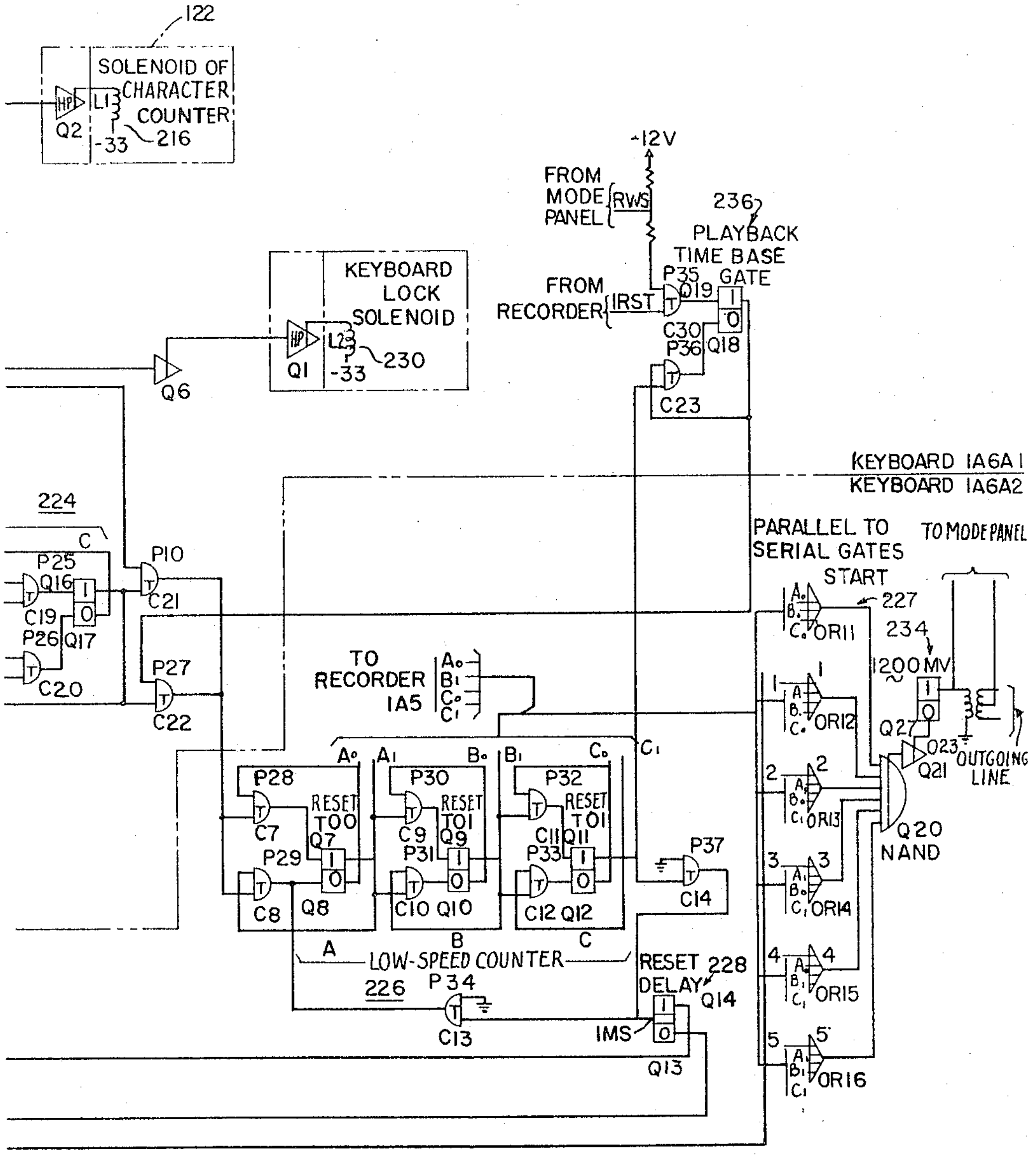
Figure 9:
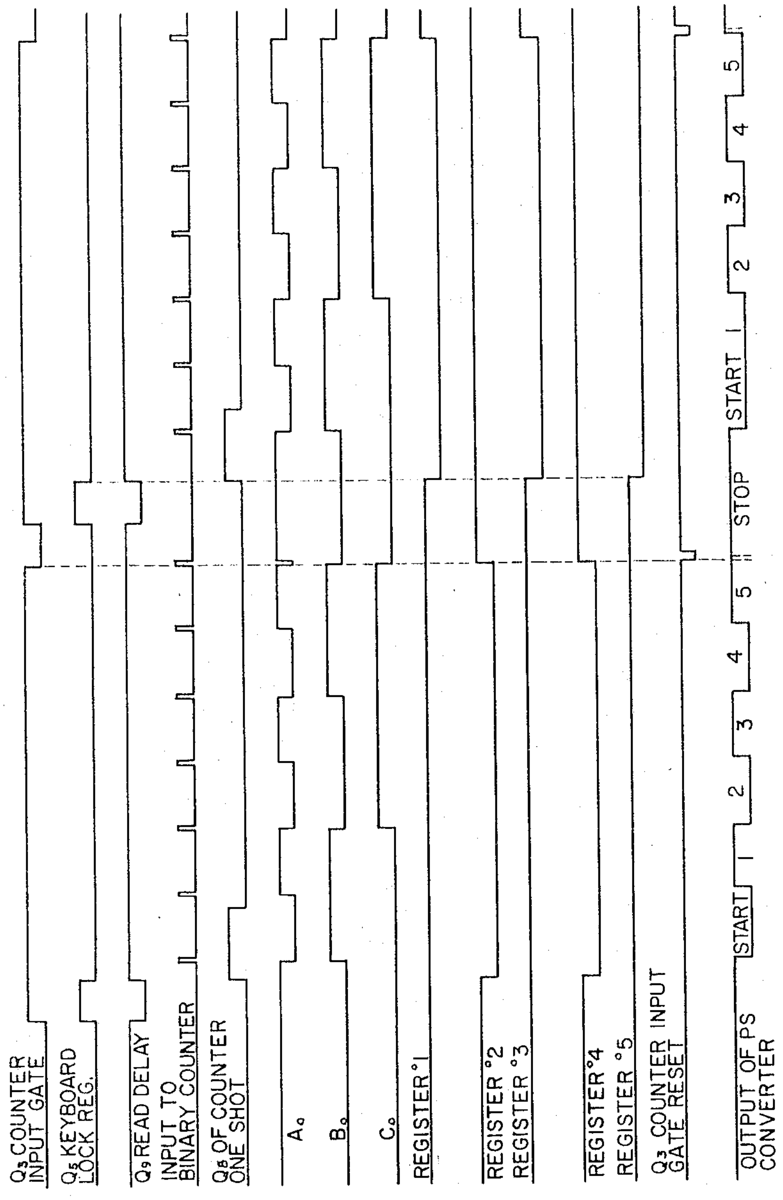
Figure 10:
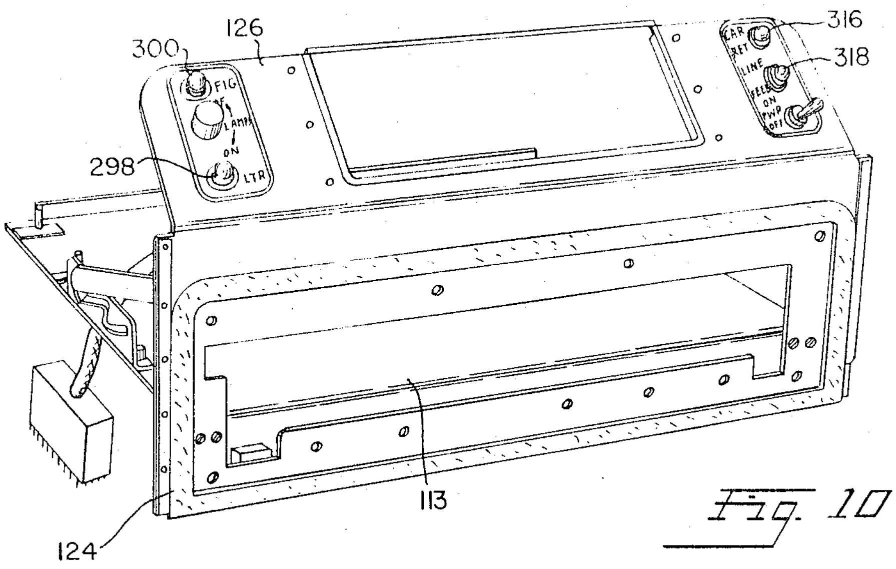
Figure 11:
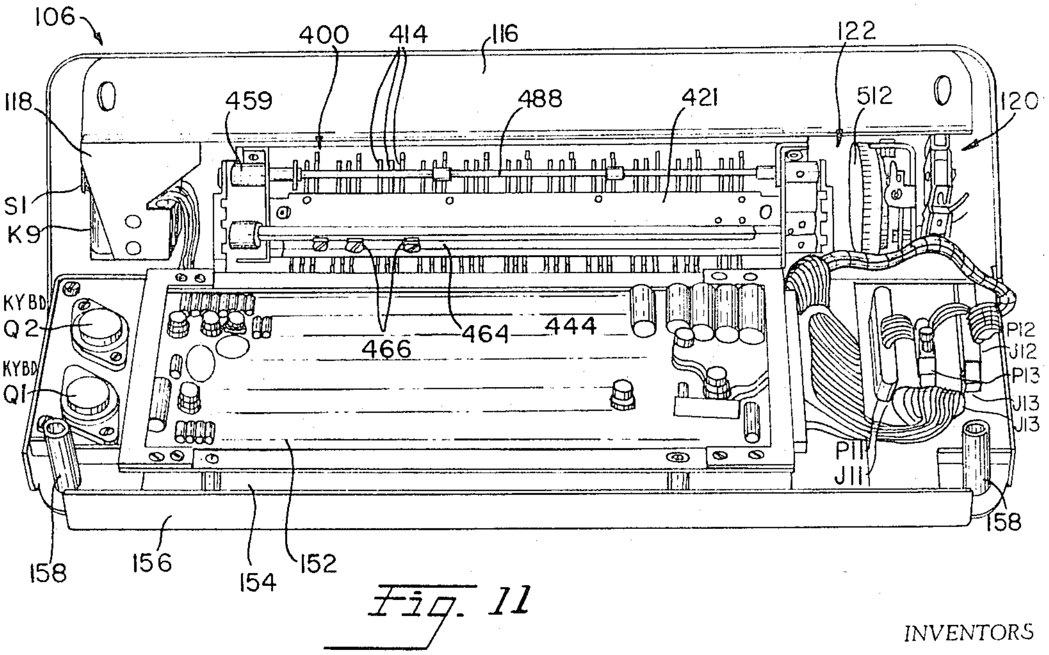
Figure 12:
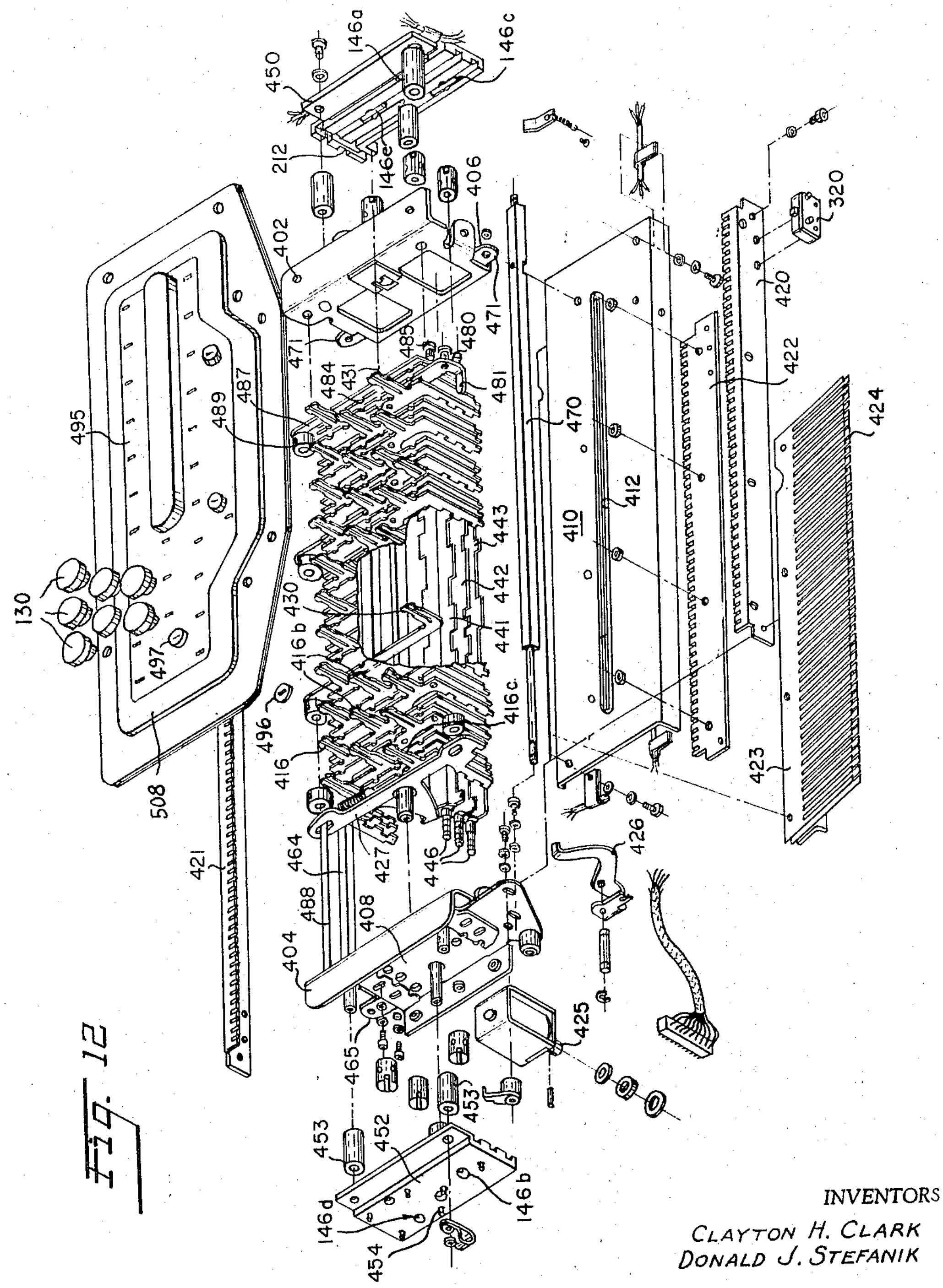
Figures 13, 14, 15, 16, 17:
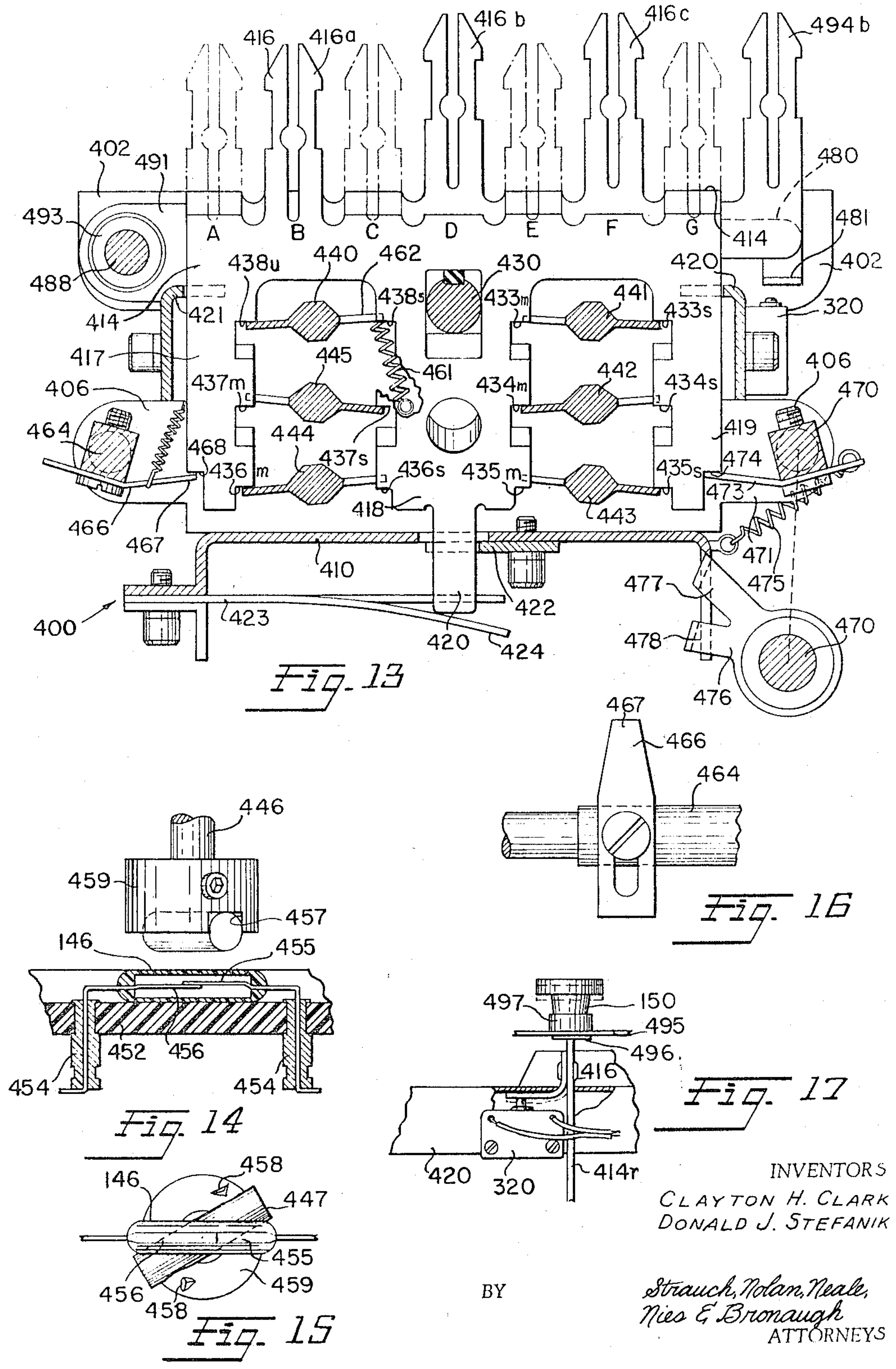
Figure 18:
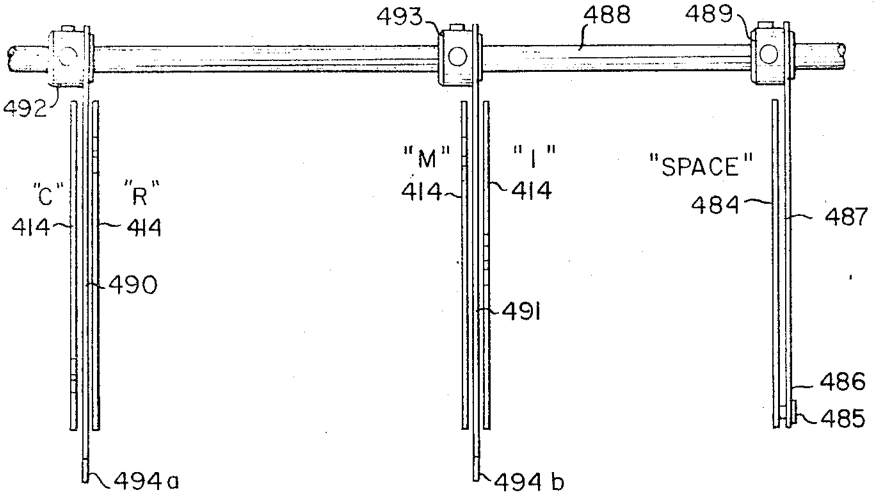
Figures 19, 20, 21:
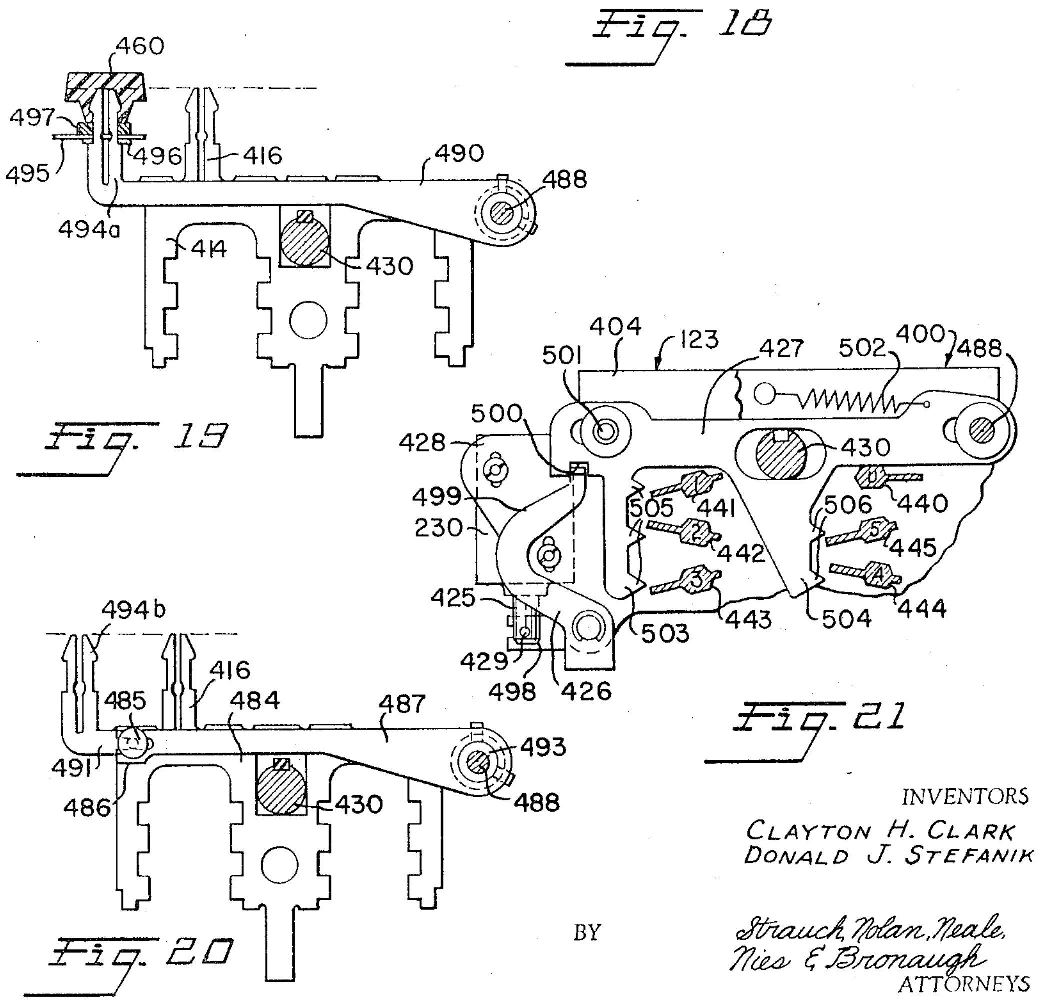

FIGURE 7 includes 14 separate blocks identified by the Letters A through P, each illustrating a basic schematic circuit corresponding to a specific logic symbol and enabling convenient construction of the electronics represented by the following logic diagram;

FIGURE 8 is shown on two sheets as FIGURES 8A and 8B and is a logic diagram for the keyboard unit;

FIGURE 9 is a timing diagram for the keyboard;

FIGURE 10 is a perspective view of the Unit #1 drawer, which mounts the keyboard, with all operating components removed;

FIGURE 11 is a rear view of the keyboard unit, removed from the #1 unit drawer front panel and with its rear wall opened and swung down to illustrate the general arrangement of subassemblies and components which are mounted in the keyboard unit;

FIGURE 12 is a partially broken away and partially exploded perspective view of the mechanical keyboard structure apart from the other components of the keyboard unit seen in FIGURES 1 and 11;

FIGURE 13 is an enlarged vertical cross-section of the keyboard structure illustrating the shape of the key plates and the manner in which they are mounted and cooperate with the code bails, the non-count shaft and the counter reset shaft, the reset lever itself being shown as offset from its normal position for clarity;

FIGURE 14 is an enlarged detail view of one of the glass enclosed reed switches and its rockably mounted code bail magnet operator;

FIGURE 15 is an end view of the reed switch and magnet operator seen in FIGURE 14;

FIGURE 16 is a detail plan view of one of the tabs used on the counter reset shaft and on the non-count shaft;

FIGURE 17 is a detail front view of the repeat key, its special key plate assembly and the repeat switch;

FIGURES 18, 19 and 20 are fragmentary views showing details of the space lever and space plate assembly; and FIGURE 21 is a fragmentary view illustrating the solenoid actuated code bail locking assembly.

GENERAL

An over-all view of an exemplary teletypewriter set 100, which uses keyboard 106, is shown in perspective in FIGURE 1. This equipment was initially developed for shipboard installation for use in telegraphic communication from ship-to-ship and from ship-to-shore, and accordingly, certain aspects of weatherproofing are included in this disclosure.

A complete teletypewriter set (FIGURE 1) consists of two units, Unit 1 and Unit 2. Unit 1 contains a printer 102, a keyboard unit 106, a magnetic tape recorder 108 and a power supply unit 110.

Figure 2:
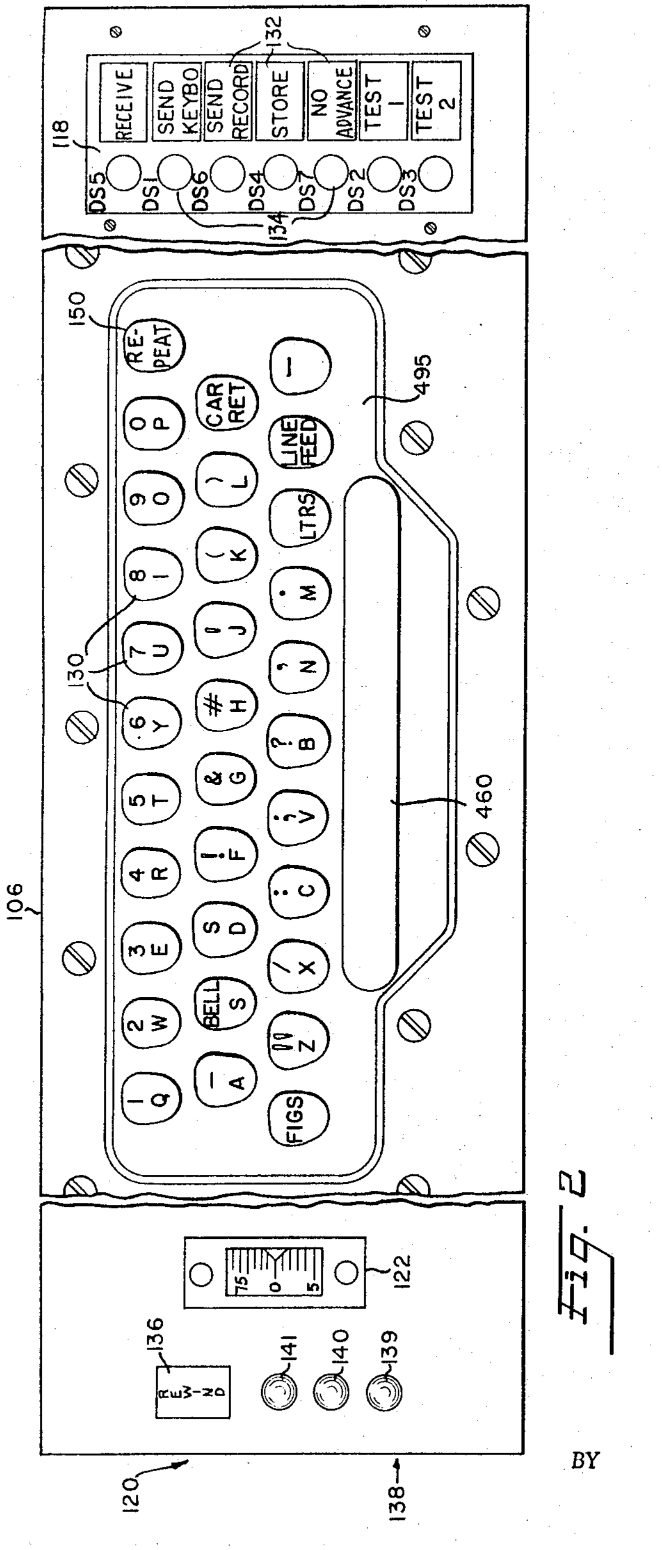
FIGURE 2 is a plan view of the keyboard illustrating the key arrangement, indicators and the mode control for the set.

The keyboard unit (see FIGURES 1, 2 and 11) consists of a cover case 116, a typing mechanism (see FIGURE 12), keyboard electronics, a mode selection panel 118, mode switches and relays K1–K9 (under the mode pushbuttons), a tape recorder monitor panel 120, a character counter 122, and a keyboard-locking mechanism 123 (see FIGURES 11, 12 and 21), the cover case 116 mounting against a seal strip 124 (see FIGURE 10) on a front wall panel 126 of the drawer 113. The mode panel subassembly 118 and a seal gasket 125 are secured to the keyboard cover case 116 by screws. Functionally, the keyboard unit also includes two tuning fork oscillators 128 which are mounted in the power supply unit 110 and provide accurate time bases for a 60- or 100-w.p.m. sequential transmission by the keyboard.

A depressed typing key 130 causes the keyboard unit to generate both a 5-bit, parallel signal in Baudot code and a 7-bit, start-stop, serial signal in Baudot code.

A depressed mode pushbutton 132 causes the keyboard to switch various input-output connections of the set to desired operating modes and to light the applicable mode indicating lamp 134.

The REWIND pushbutton 136 on the record monitor panel 120 causes the keyboard unit to signal the tape recorder 108 to rewind its magnetic tape.

In response to the signals from the recorder 108 the keyboard unit 106 indicates, by lighted ones of lamps 138, the position of the tape in the recorder.

As determined by the selected mode of operation, the keyboard unit 106, as part of Unit 1, is used (1) to send coded messages through a 1200 cycle tone generator 144 (see FIGURE 3) directly to the outgoing line (SEND KEYBD mode), (2) to store a message in the magnetic tape recorder 108 (STORE mode), and (3) to test the printers 102 and 104 (TEST 1 and TEST 2 modes).

The 32 typing keys are arranged in a mechanical keyboard 400 (FIGURE 12) in three rows in teletypewriter order, although having typewriter spacing between keys. One to five glass-enclosed reed switch contacts 146 (see FIGURE 8) (to be later fully described) close magnetically in response to the depression of any key to provide a parallel electrical encoding of the corresponding character. A sixth reed switch 148 (universal bar switch) closes for each key depression to supply a start signal to the associated keyboard electronic circuits. The feel of an electric typewriter keyboard is duplicated even though there is no mechanical linkage between typing mechanism and printer. Two-character typing bursts that exceed the line rate of 60 or 100 w.p.m. are permissible; the kyeboard lock solenoid 123 and associated mechanism holding the second character in mechanical storage until the first character is transmitted electrically. A repeat key 150 (see FIGURE 17) permits repeated transmission of any character whose associated key 130 is held down at the same time.

The main function of the keyboard electronics (see logic diagram of FIGURE 8) is to convert parallel electrical signals generated by the typing mechanism or by the recorder into the serial electrical signals required by the outgoing line. The keyboard electronics are contained principally on two printed circuit boards 152 and 154 (see FIGURE 11) mounted in the rear wall unit 156 of the keyboard unit 106.

Seven mode pushbuttons 132 and seven associated lamps 134 make up the mode selection panel 118 to the right of the typing keys. The pushbuttons allow the operator to select a mode of operation for either Unit 1 or Unit 2. Momentary operation of a pushbutton causes operation of an associated switch and electrical locking of one or more associated mode relays K1–K9 and also lights a corresponding lamp 134 (DS1–DS7) on the mode selection panel 118. With the pushbuttons, the operator can place the set in the following modes:

(1) IDLE—(RECEIVE): In the idle mode, the motors of both printers are off; the RECEIVE lamp DS5 is on; and the set is available for local use, for receiving from another station, or for both, simultaneously. Operation of the RECEIVE pushbutton places the set in the idle mode and discontinues all other modes except the RECEIVE mode. To set up an incoming call to this station, associated telegraph terminal group equipment (not part of this invention) operates a supervisory relay in Unit 1 or Unit 2 to turn on the associated printer motor and thus place the set in the RECEIVE mode.

(2) STORE: The STORE mode connects the parallel output of the keyboard unit 106 to the tape recorder 108 and the serial output of the same keyboard unit 106 to the printer 102. This allows the operator to store a message prior to sending it to the outgoing line and to monito the storing process. Operation of the STORE pushbutton places the set in the STORE mode and lights the STORE lamp DS4. After typing the message to record it on the magnetic tape, the operator presses the REWIND pushbutton 136 on the recorder monitor panel 120. This action causes the tape recorder 108 to rewind and thus places the message on the tape in a position to be read and set to the line.

(3) NO ADVANCE: The NO ADVANCE mode duplicates the STORE mode except that a blank area (used as a signal condition as will be fully described hereinafter) is not inserted on the magnetic tape just ahead of the recorded message. This mode is used after a STORE mode has been interrupted to allow receipt of an incoming message on the Unit 1 printer. A blank area cannot be permitted in a recorded message on the tape since the area is used by the recorder 108 to recognize the end of a message.

(4) SEND KEYBOARD: To set up a call to the outgoing line, the operator presses the SEND KEYBD pushbutton. This extends a D.C. supervisory ground from the connecting equipment to a mode switching relay (which operates from and locks to the supervisory ground). The RECEIVE lamp DS5 turns off and the SEND KEYBD lamp DS1 turns on. In the SEND KEYBD mode, it is possible to receive on Unit 1 printer 102 or on Unit 2 printer 104 or on both printers simultaneously; the output of the keyboard does not appear on the Unit 1 printer 102 as it does during the STORE mode. All characters typed on the keyboard during this mode are sent to the outgoing line.

(5) SEND RECORD: To send from the recorder to the outgoing line during the SEND KEYBD mode, the operator presses the SEND RECORD pushbutton. This starts the tape recorder 108 which will send one tape recorded message and then stop automatically.

(6) TEST 1: The TEST 1 mode allows the operator to test the Unit 1 printer by typing directly into it.

(7) TEST 2: The TEST 2 mode allows the operator to test the Unit 2 printed by typing directly into it.

*Over-all functional description*

Figure 4:
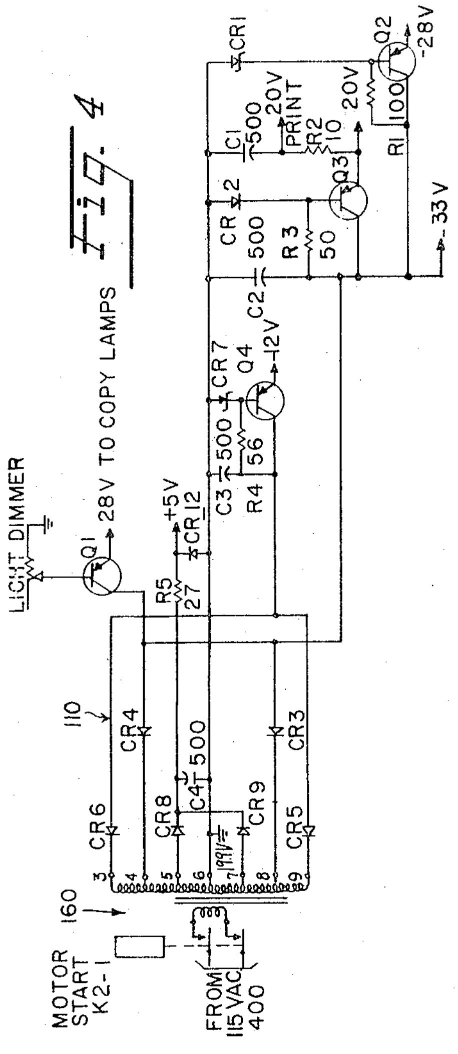
FIGURE 4 is a simplified schematic of a power supply circuit, one of which is included with each of Units 1 and 2 in a set.
Figure 3:
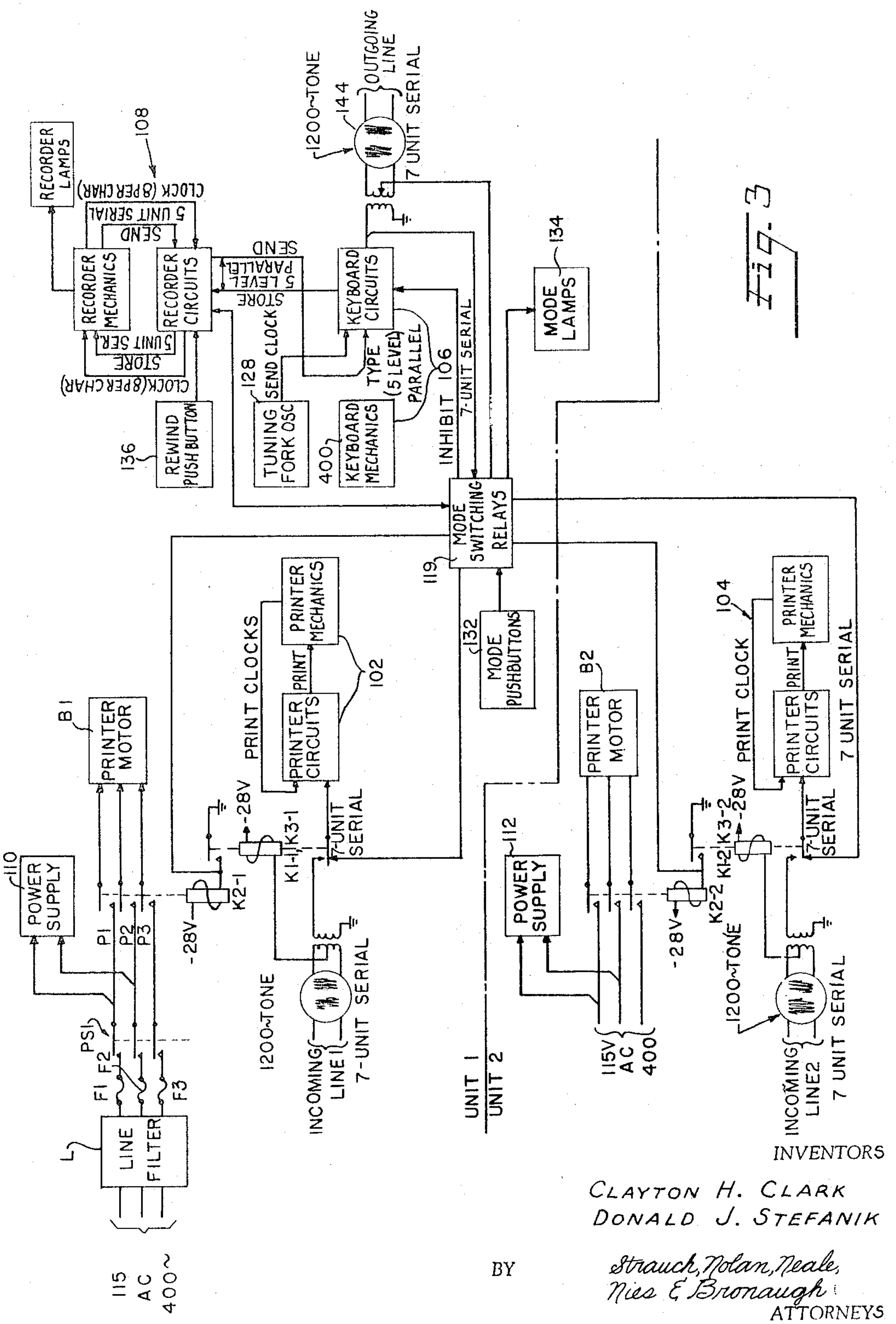
FIGURE 3 is a block diagram illustrating the operating functions of the complete teletypewriter set depicted in FIGURE 1.
Figure 5A:
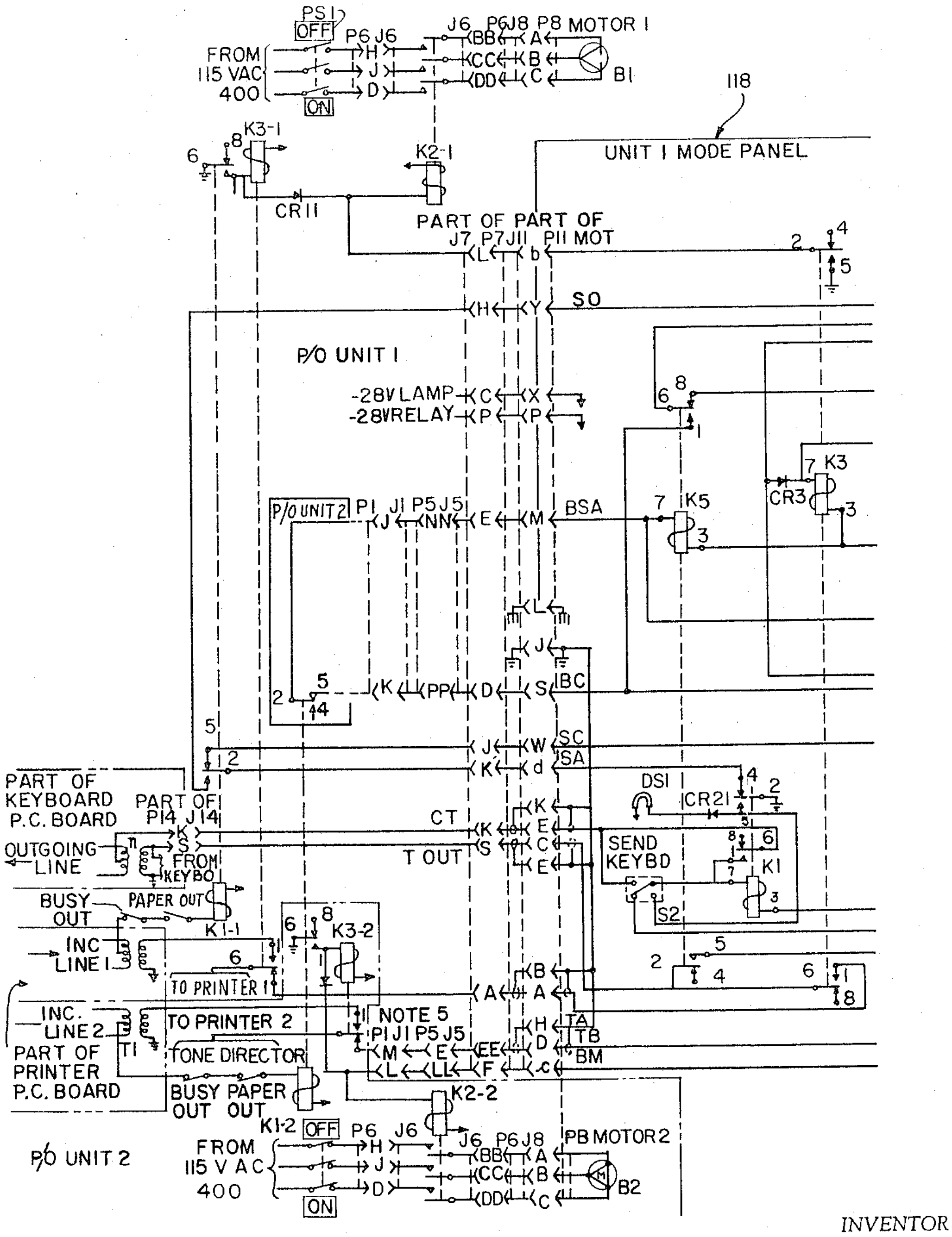
FIGURE 5 is shown on two sheets as FIGURES 5A and 5B and is a schematic illustrating the circuitry of the mode control panel on the keyboard unit and, for convenience, some components of correlated subassemblies in the teletypewriter set.
Figure 5B:
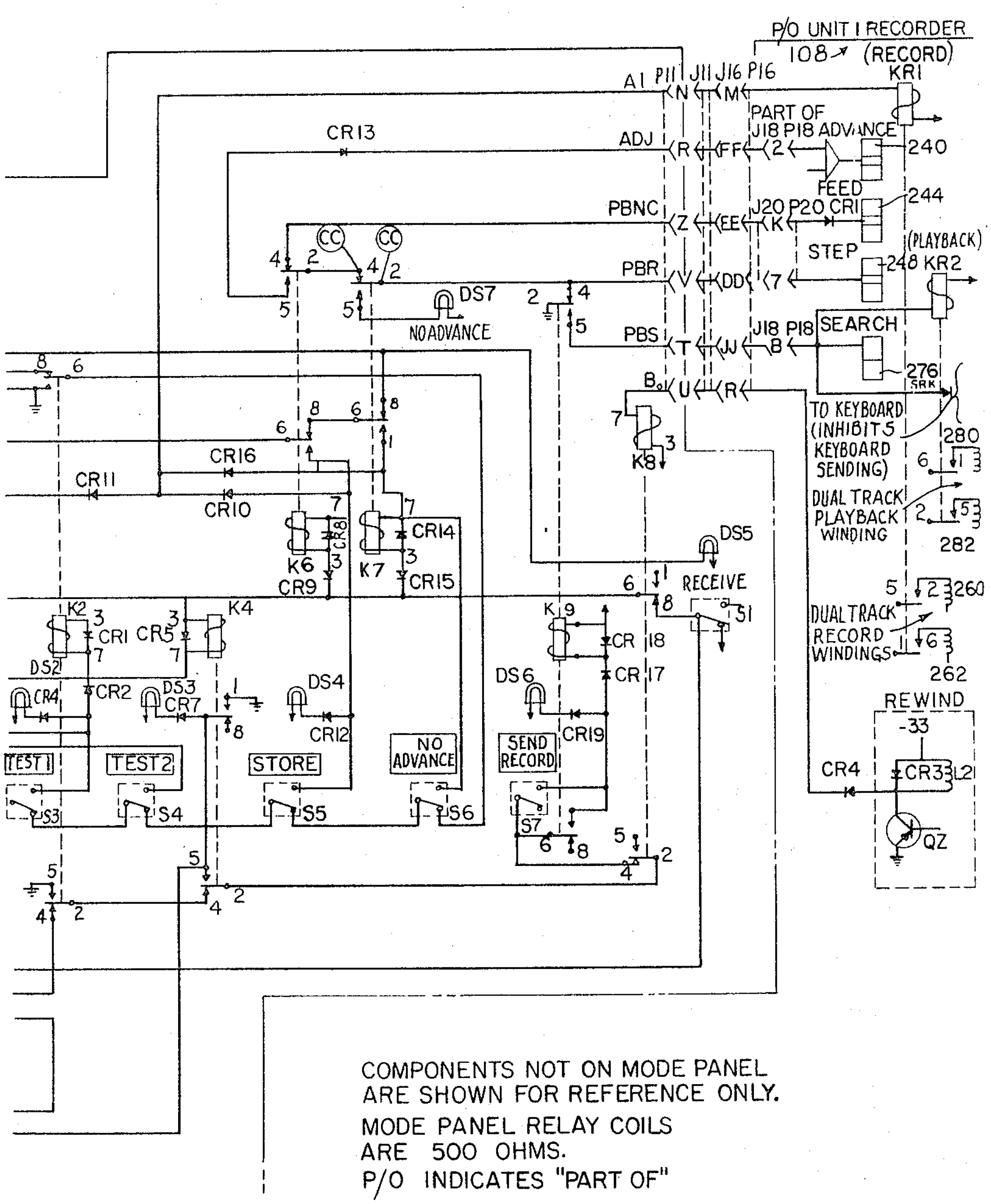

FIGURE 3 shows the various functional sections and associated external signaling lines of the exemplary teletypewriter set, FIGURE 4 shows the power supply circuit and FIGURES 5A and 5B viewed as a single figure show the mode panel control circuits.

OUTGOING MESSAGES: Since outgoing transmission depends on the availability of remote switching equipment (not shown) the associated equipment (not shown) will of course determine when a call can be originated. To request use of the outgoing line, the local operator depresses the KEYBD SEND push button to operate switch S–2 to connect a mode relay K1 to the outgoing line. If the associated equipment is available, ground potential is applied to the outgoing line on a simplex basis, completing a circuit for the mode panel relay K1. Relay K1 locks to the supervisory ground signaling through its relay terminals 1 and 6 and lights the SEND KEYBD lamp DS–1 through relay terminals 2 and 5 to signal the operator that sending may start.

MESSAGE PREPARATION CONTROL: Control of the Unit 1 recorder 108 while storing a message is maintained from the Unit 1 keyboard 106 through mode push buttons REWIND, STORE, and NO ADVANCE.

STORE: The STORE mode pushbutton, through switch S5, lights the STORE lamp DS4 and energizes relays K6 and K3 which (a) prepare the circuits of the recording head windings through recorder relay KR1, (b) keep the STORE lamp DS4 lighted, (c) lock under control of contacts 2 and 5 of the RECEIVE mode relay K1–1 so that the associated equipment can interrupt the STORE mode, and (d) as described under a following section entitled Recorder Logic, trigger the advance controller of the recorder circuitry through contacts 2 and 5 of relay K–6 to advance a small amount of tape over the recording head. This blank portion of tape will act as an end-of-message signal for the first of two messages stored successively. Further, the operated mode panel relays K6 and K3 (a) start the Unit 1 printer motor B1, and (b) connect the output of the keyboard through contacts 1 and 6 of relay K3 and contacts 6 and 8 of supervisory relay K3–1 to the input of the Unit 1 printer 102 so that the printer will monitor what is being stored.

NO ADVANCE: The NO ADVANCE mode pushbutton, through switch S6, lights the NO ADVANCE lamp DS7 and energizes mode panel relays K7 and K3 which (a) prepare the circuits of the recording head windings, (b) keep the NO ADVANCE lamp DS7 lighted, and (c) locks under control of the RECEIVE mode relay K1–1 so that the associated equipment can interrupt the NO ADVANCE mode (which is an auxiliary STORE condition). Note that the advance control of the recorder is by-passed in this mode and no blank tape is inserted ahead of the stored message. Further, the operated mode panel relays K7 and K3 (a) through contacts 2 and 5 of relay K3, start the Unit 1 printer motor B1, and (b) through contacts 1 and 6 of relay K3, connect the output of the keyboard 106 to the input of the Unit 1 printer 102 so that the printer 102 will monitor what is being stored in recorder 108.

KEYBOARD: The keyboard 106 is always connected to the outgoing line. As soon as the SEND KEYBD lamp DS1 lights when the SEND KEYBD pushbutton switch S2 is operated, associated equipment is available to extend the call to the desired station and the operator may start typing.

RECORDER: When the called station is reached (as indicated by acknowledgement characters being printed by the Unit 1 printer 102), the recorder 108 is started by operation of the SEND RECORD pushbutton. This pushbutton operates switch S7 to energize mode panel relay K9 which (a) through its contacts 2 and 5 prepares the circuits of the recorder playback head windings 280 and 282, (b) lights the lamp DS6 beside the SEND RECORD pushbutton, (c) locks under control of the supervisory ground returned over the outgoing line from the associated equipment and through contacts 1 and 6 of SEND KEYBD relay K1, (d) triggers a searching operation by the recorder 108 by a ground through contacts 2 and 5 of relay K9, and (e) blocks the keyboard electrically through the same contacts 2 and 5 of relay K9 and associated keyboard circuitry so that the keys cannot supply a character even if operated by mistake. In searching, the recorder 108 advances the magnetic tape over the head but does not send to the outgoing line until a character is found on the tape.

OUTGOING SIGNALING: A 1200-cycle, free-running multivibrator supplies a mark tone on the outgoing line with the spacing pulses provided by turning off the multivibrator for a time controlled by a tuning fork oscillator frequency standard. The frequency standard drives a 3-stage counter, the output of which turns the multivibrator on and off in a series of marks and spaces determined by the Baudot code of the desired character. Characters are supplied either by depressing a keyboard typing key 130 or by causing the recorder 108 to move a character stored on magnetic tape past the recorder head playback windings 280 and 282.

*Mode circuit operation*

FIGURE 3 shows the mode panel and its associated circuits in schematic form. The following theory explanation shows how the relays of the mode panel switch the various internal and external connections of the teletypewriter set under control of both the associated equipment (not shown) and the local operator.

IDLE CONDITION: With no incoming or outgoing traffic, all mode panel relays K1 through K9 are released, and the two supervisory relays K1–1 and K1–2 for printer 102 are released. Motor B2 control relays K2–1 and K2–2 are also released and the printer driving motors B1 and B2 are off. Further, incoming line relays K3–1 and K3–2 are released. The RECEIVE lamp DS5 is lighted during the idle condition through the following circuit: negative 28 volts through lamp DS5, contacts 8 and 6 of relay K7, contacts 8 and 6 of relay K6, contacts 8 and 6 of relay K5, contacts 8 and 6 of relay K2, normally closed contacts of the NO ADVANCE, STORE, TEST 2 and TEST 1 switches, pin W of P11–J11, pin J of P7–J7, contacts 5 and 2 of relay K1–1, pin K of J7–P7, pin *d* of J11–P11, contacts 4 and 2 of relay K1, to ground.

RECEIVE CONDITION: The associated equipment provides ground potential to incoming line 1 or 2 to signal the corresponding Unit 1 or Unit 2 printer to receive. This simplex ground signaling operates relay K1–1 or K1–2. Hence, if Unit 1 is to receive, line 1 is grounded and the following events occur. Battery-connected relay K1–1 operates, and switches the operating circuit for RECEIVE lamp DS5 through contacts 2 and 4 so that now only relay K1 controls the RECEIVE lamp. The RECEIVE lamp remains on as a signal that a message will be sent to the set. Relay K1–1 energizes relays K2–1 and K3–1 from ground through its contacts 6 and 1. Diode CR11, in the operating path of relay K3–1, will allow current to flow from contacts 6 and 1 of relay K1–1 to the coil of relay K2–1, but will block current flow in the opposite direction when relay K2–1 is operated by mode panel relay K3. Relay K2–1 then turns on the printer motor of Unit 1. Relay K3–1 then connects the incoming signal line to the printer electronics through its contacts 6 and 1, and disconnects the keyboard output circuit from the printer electronics. During the STORE mode (as will be explained hereinafter) relay K3–1 is released to disconnect the incoming signal line from the printer while the keyboard is sending. The mark tone on the incoming line would otherwise prevent the printer from monitoring what is being sent by the keyboard. At the end of the message, the associated equipment removes ground potential from incoming line 1. Relays K1–1, K2–1, and K3–1 release, the printer motor B1 of Unit 1 turns off, and the RECEIVE lamp DS5 remains lighted.

STORE: To store a message in the recorder before sending to the outgoing line, the operator depresses and holds the REWIND pushbutton until the green start-of-tape lamp lights momentarily. Operation of the STORE pushbutton now completes a circuit for relay K6 as follows: negative 28 volts through RECEIVE switch S1, contacts 8 and 6 of relay K8, blocking diode CR9, coil of relay K6, operated contacts of STORE switch S5, non-operated contacts of switches S4 and S3, pin W of P11–J11, pin J of P7–J7, contacts 5 and 2 of relay K1–1, pin K of J7–P7, pin *d* of J11–P11, contacts 4 and 2 of relay K1, to ground. Relay K6 operates and turns off the RECEIVE lamp DS5 through contacts 8 and 6; locks itself to the same operating ground that was used by the RECEIVE lamp through contacts 6 and 1; and extends ground to the recorder to trigger the advance one-shot through contacts 2 and 5. The STORE lamp DS4 lights from the same circuit that holds relay K6 operated. The recorder advances the tape a set amount to assure that any variation in the commutator contacts that light the start-of-tape will not prevent recording from starting on a usable portion of the tape.

The same circuit that operates relay K6 also operates relay K3 as follows, starting from ground already traced to terminal 7 of relay K6: diode CR10, diode CR11, coil of relay K3, contacts 6 and 8 of relay K8, normally-closed contacts of the RECEIVE switch S1, to negative 28 volts. Operated, relay K3 at contacts 1 and 6 completes a circuit from the keyboard output to the printer 102 input as follows: keyboard connectors P14–J14 pin S, connectors J7–P7 pin S, mode panel connectors J11–P11 pin C, contacts 6 and 1 of relay K3, connectors P11–J11 pin A, connectors P7–J7 pin A, contacts 8 and 6 of relay K3–1, to the printer 102 electronics. This path allows the information being stored in the recorder to appear also on the printer 102 of Unit 1. Mode panel relay K3 operates power supply relay K2–1 through contacts 5 and 2 which supplies power to the motor B1 of printer 102. The same operating circuit used for relay K6 also operates the magnetic tape recorder relay KR1 via diode CR10. Recorder relay KR1 prepares circuits to the record head windings 260 and 262.

To interrupt the STORE mode for an incoming message, the associated equipment places ground potential on incoming line 1. Relay K1–1 operates; lights the RECEIVE lamp DS5 through contacts 2 and 4; releases relays K6 and K3 through contacts 2 and 5; turns off the STORE lamp DS4; and releases recorder relay KR1. Relay K1–1 holds relay K2–1 operated through contacts 6 and 1 to keep the motor running, and operates relay K3–1 to connect incoming line 1 to the printer tone detector.

NO ADVANCE: To continue storing a message in the recorder after an interruption to allow an incoming message to be received, the operator depresses the NO ADVANCE pushbutton. Operated, the NO ADVANCE switch S6 completes a circuit to relay K7 from the same ground that the STORE switch S5 extended to relay K6, as has been explained hereinbefore. Relay K7 operates, lights the NO ADVANCE lamp DS7 through contacts 2 and 5, turns off the RECEIVE lamp DS5 through contacts 8 and 6, and at contacts 6 and 1 locks to the original operating ground from relay K1 contacts 4 and 2. Note that the advance one-shot 240 in the recorder electronics is not triggered as occurred in the previously described STORE mode. Relay K3 operates as in the STORE mode to turn on the Unit 1 printer motor B1 and to connect the keyboard output to the printer 102.

REWIND AFTER STORE OR NO ADVANCE: After a message is stored, the operator depresses the REWIND pushbutton. Mode panel relay K8 operates through recorder transistor Q2 which is turned on by the operated pushbutton switch. Relay K8 at contacts 8 and 6 releases relay K6 (STORE mode) or K7 (NO ADVANCE mode), and also releases relay K3. When rewind is completed, recorder transistor Q2 (see portion of recorder electronics, lower right of FIGURE 5B) is turned off and relay K8 releases.

SEND KEYBD: Before sending to the outgoing line, the operator depresses the SEND KEYBD pushbutton. If the associated equipment is ready to assign a link to this station, ground potential is placed on the outgoing line. Switch S2 extends this ground to relay K1. Relay K1 locks to the ground on the outgoing line through contacts 7 and 6, lights the SEND KEYBD lamp DS1 through contacts 2 and 5, and turns off the RECEIVE lamp DS5 through contacts 2 and 4. With the SEND KEYBD lamp DS1 on, the operator types the called station's call letters and then depresses the RECEIVE pushbutton. Relay K1 releases because the operated RECEIVE switch S1 opens its circuit. Relay K1 disconnects negative 28 volts from the outgoing line through contacts 7 and 6 as a signal that the call letters have been sent. When the connection is established to the called station, a go-ahead signal is sent by the associated equipment to the printer of Unit 1. The operator now depresses the SEND KEYBD pushbutton again and types the message or starts the recorder. The SEND KEYBD switch S2 extends ground potential to relay K1. Relay K1 operates, locks to the outgoing line as before, and lights the SEND KEYBD lamp DS1.

SEND RECORD: After receiving a go-ahead signal, in the manner above described, the operator depresses the SEND KEYBD pushbutton to seize the outgoing line. If the recorder is to send the message, the operator next depresses the SEND RECORD pushbutton. Switch S7 extends ground from relay K1 contacts 2 and 5 to relay K9 and to the SEND RECORD lamp DS6. Operated, relay K9 locks through contacts 1 and 6, and triggers the recorder search register 276 through contacts 2 and 5 to allow the tape to be searched for the first character of the message. Relay K9 also operates recorder relay KR2 through contacts 2 and 5 to provide circuits for the recorder head playback windings 280, 282. Further, relay K9 provides an inhibit level to the keyboard through contacts 2 and 5 to prevent keyboard sending even though a key is depressed by mistake. When the recorder reaches the end of the stored message, the blank tape that follows the message will stop the tape movement. The operator on noting the end of the message on the printer 102 of Unit 1, or on noting that the sound of recorder operation has ceased, can depress the REWIND OR RECEIVE pushbutton.

If the REWIND pushbutton is depressed, relay K8 operates through the circuit previously described, and releases relay K9 and turns off the SEND RECORD lamp DS6.

If the RECEIVE pushbutton is depressed instead of the REWIND pushbutton, relay K1 releases, releasing relay K9 through contacts 6 and 7, and turning off the SEND KEYBD lamp DS1 through contacts 2 and 5.

Figure 6:
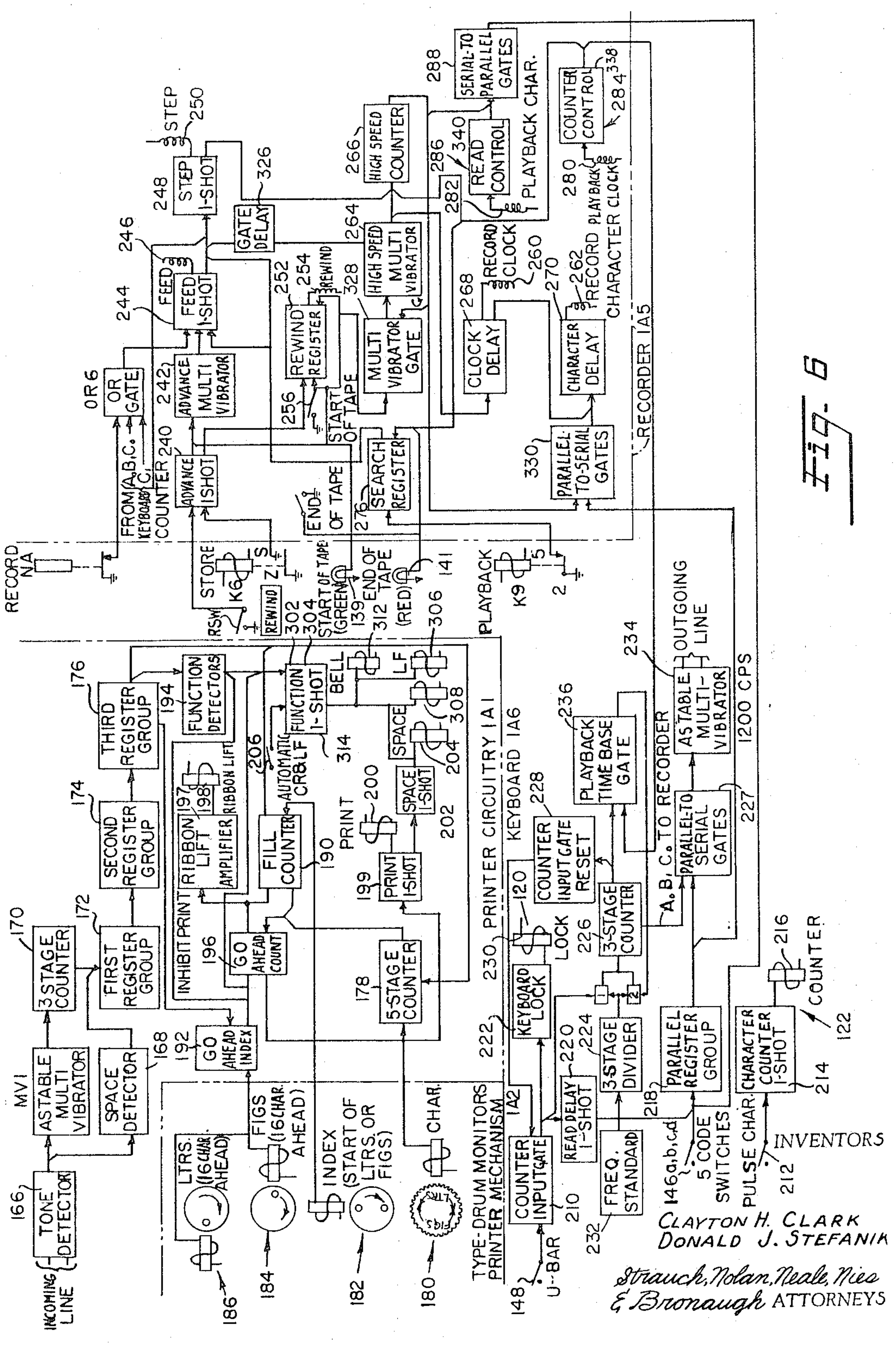
FIGURE 6 is a block diagram more detailed than FIGURE 5, illustrating general electrical, electronic and mechanical components utilized in Unit 1 which includes a keyboard, a printer and a recorder together with a power supply (not shown in this figure)

KEYBOARD UNIT CIRCUIT FUNCTIONING: The block diagram description below refers to FIGURE 6 and expands on the general description of the keyboard as has been presented hereinbefore. The mechanical keyboard structure will be fully described in a later section.

TYPING KEYS: A depressed typing key 130 or space bar 460 triggers the following operations:

(1) Contacts of a U-bar reed switch 148 close and set a counter input gate register 210.

(2) Contacts of a pulse-per-character switch 212 close and trigger a character counter one-shot 214 energizing a counter stepping solenoid 216. The pulse-per-character switch 212 close each time a character key button is depressed to cause the receiving printer 102 to either print and space or just to space. When closed, the switch 212 triggers the character counter one-shot 214 to energize the counter solenoid 216 long enough to advance the character counter 122 one index step.

(3) The contacts of one to five reed code switches 146_a_–146_e_ close, depending on the Baudot code of the typed character. The ground levels provided by these switches 146 set a parallel register group 218 after a 7 to 10 millisecond time delay. This delay is provided by a read delay one-shot 220 and guarantees that the reed contacts code switches 146 will stop vibrating *before* the indicated character is gated into the parallel register group 218.

COUNTER INPUT GATE 210 is set by each typed character. In being set, the register 210 (a) triggers the read delay one-shot 220, (b) sets a keyboard lock register 222, and provides a level that will allow an output pulse from a 3-stage divider 224 to step a 3-stage counter 226. After countdown is completed by the counter 226, it resets the counter input gate 210 via a flip-flop register 228 called a "counter input gate reset."

KEYBOARD LOCK MECHANISM 123: The code bails of the keyboard, as will be described hereinafter, are locked momentarily each time a depressed typing key moves them to encode the corresponding character. The keyboard lock register 222, set by the counter input gate 210, operates a lock solenoid 230 to perform a mechanical locking operation by means of a lock plate (see FIGURE 21) to be later described. When two characters are typed in rapid succession, such that the line rate is exceeded, the first character is transmitted and the second character will be held locked in mechanical storage in the keyboard 106 until the first character is completely transmitted electrically. In addition to effecting mechanical storage, the lock mechanism 123, by preventing movement of the code bails, also prevents depression of any other typing key.

When the recorder 108 is sending and at other times when it is necessary to prevent use of the keyboard, inhibition of the keyboard is not accomplished by the lock mechanism 123. Rather, input from the U-bar reed switch 148 to the counter input gate 210 is inhibited electrically as will be hereinafter more fully described.

READ DELAY ONE-SHOT 220 is triggered by the counter input gate 210. After the 7- to 10-millisecond delay designed into the circuit, the one-shot 220 gates the output of the code switches 146 into the parallel register group 218.

FREQUENCY STANDARD 232: Two are used, one for 60 w.p.m. and one for 100 w.p.m., and whichever standard is used, a tuning fork oscillator located in the power supply unit 110 provides pulses continuously at a rate that does not vary more than ±.01 percent. The output frequency of the selected frequency standard 232 is divided down by the 3-stage divider 224 so that every eighth pulse from the standard steps the 3-stage counter 226. A character stored in the parallel register group 218 by a depressed keyboard key, or alternatively by the tape recorder 108, is gated sequentially into a 1200-cycle astable multivibrator 234 by the 3-stage counter 226. This free-running multivibrator 234 supplies the 1200-cycle tone used for signaling on the outgoing line and is turned on and off by the 3-stage counter 226 via a set of parallel-to-serial gates 227.

When sending is initiated by a depressed typing key, the counter 226 is started by the counter input gate 210. At the end of countdown, the counter 226 resets the counter input gate 210 via the counter input gate reset register 228.

When sending is initiated by the magnetic tape recorder 108, the counter 226 is started by a playback time base gate 236. At the start of countdown, the counter 226 signals the recorder (via $A_0B_1C_0$) to move the magnetic tape one character step.

*Basic circuits and logic symbols*

FIGURE 7 shows the basic circuits and corresponding logic symbols used in the keyboard logic diagram of FIGURE 8. This section includes a description of each basic circuit and the corresponding logic symbol, and the immediately following sections explain the switching logic of the printer, keyboard, and recorder as shown on related logic and timing diagrams.

Positive-going transitions are used to transfer information from one transistor stage to another. Logic 1 is defined as zero or ground potential; logic 0 is defined as negative or minus 12 volts potential. Therefore, a positive-going transition is a rapid change from logic 0 to logic 1. This change is available at the collector of a transistor as it is driven from the off state to saturation. In the transistorized circuitry of this invention, a positive transition (that is, positive pulse) will turn off a transistor to set or reset a register or to trigger a one-shot.

The logic symbols shown on FIGURE 7 provide both a logic and a block diagram representation of the circuit shown at the left of the symbol. Input and output leads are designated A, T, Q, etc. on both the circuit and logic symbol to allow exact interpretation. The following points must be understood: (1) If a stage inverts the input signal, the output lead leaves the symbol in a vertical direction as shown in FIGURE 7, blocks A, B and H. (2) The basic logic symbol for flip-flop stages shows the set state. The upper square of the symbol is always marked 1; the input lead is the setting input; the output lead is the collector of the transistor that is turned on and, therefore, goes to logic 1 as the stage is set. Similarly, the lower square of the symbol is always marked 0; the input lead is the reset input; the output lead is the collector of the transistor that is turned off by the setting pulse and that, therefore, goes to logic 0 as the stage is set. (3) An inhibiting input is marked with a circle as shown in FIGURE 7, block E, lead I.

INVERTER: FIGURE 7, block A shows an inverter or amplifier. The same symbol enlarged with the letters HP (high power) is used on FIGURE 8 for driver stages that energize solenoids. Transistor Q1 is normally on due to the forward bias −12 volts which is sufficient to override the reverse bias of the +5 volts. A logic 0 on lead A will not change the state of the circuit; therefore, the output on lead T is logic 1. A logic 1 on lead A will block the −12 volt forward bias and allow the +5-volt reverse bias to turn off transistor Q1. With transistor Q1 turned off, a logic 0 is present on output lead T.

PEDESTAL GATE: FIGURE 7, block B shows a pedestal gate, so named because a positive level on input lead A raises the voltage swing used to trigger via input lead B to the point where it can turn off a transistor. Pedestal gates are used extensively since they are so flexible. For example, a triggering pulse can be blocked by having a negative level rather than a positive level on the A input lead. Further, information available as a level can be stored on the gate, to be used at a later time when the triggering pulse is supplied. The diode in the output of a pedestal gate blocks the negative pulse that is inherent in the differentiating action of the circuit. Pedestal gates that are primarily differentiating networks have the A input resistor always at ground potential and are so shown on the printer, keyboard, and recorder logic diagrams.

DELAY: FIGURE 7, block C shows the circuit and associated logic symbol used to provide a short delay. Longer delays are provided by one-shots as described below for block L. Transistor Q1 is biased on by the −12 volts present at its base through resistor R1. A positive pulse on lead A turns off transistor Q1. Transistor Q1 remains off until capacitor C1 discharges through resistor R1. The length of the delay is determined by the value of resistor R1 and capacitor C1.

SINGLE DIODE GATE: FIGURE 7, block D shows a diode gate that has only one input. The function of the gate is to pass only positive pulses and to block negative pulses.

OR GATE: The truth table in FIGURE 7, block F shows that the output of an OR gate is logic 1 (positive) when any one input is logic 1. With all of the inputs at logic 0 (negative), the output is also at logic 0. A change of any one input to logic 1 provides a positive triggering pulse. FIGURE 12 shows OR gates used as machine function detectors (OR gates OR2, OR5, OR11, OR12, OR13, and OR14). These gates provide a logic 0 level that allows a triggering pulse to set a corresponding one-shot. NOR GATE: FIGURE 7, block G shows a NOR (not OR) gate that is the same as an OR gate except that the output of the OR portion is fed through a transistor to invert the output.

OR GATE WITH INHIBITOR: FIGURE 7, block E shows an OR gate with an inhibiting input. With logic 1 applied by the inhibitor, it is impossible to produce an output transition form 0 to 1 since the output is always at 1.

AND GATE: The truth table in FIGURE 7, block J shows that the output of an AND gate is logic 1 only when all inputs are logic 1.

NAND GATE: FIGURE 7, block H shows a NAND (not AND) gate that is the same as an AND gate except that the output of the AND portion is fed through a transistor to invert the output.

REGISTER: FIGURE 7, block K shows a flip-flop register that is used as a temporary storage component. When voltage is initially applied to the circuit, one of the transistors conducts first due to circuit value imbalance. Assuming transistor Q1 turns on, its collector approaches ground. The current from +5 volts through register R4, resister R2, and the collector-emitter junction of Q1 places a level of approximately +2 volts at the base of transistor Q2, insuring its cut-off. A positive pulse applied to lead S is passed by diode CR1 and turns off transistor Q1. The collector of Q1 goes to −12 volts which is present through the cross-coupling resistor R2 to the base of transistor Q2, causing transistor Q2 to turn on. When transistor Q2 turns on, its collector approaches ground. The current from +5 volts through resister R3, resistor R5, and collector-emitter junction of transistor Q2 places a level of approximately +2 volts at the base of transistor Q1, reverse biasing it. A positive pulse at point R will pass through diode CR2 and turn off transistor Q2. This will flip the circuit back to its original condition. Alternate pulses at point S and point R will flip the circuit back and forth.

ONE SHOT: FIGURE 7, block L shown a one-shot that is used as an accurate timing device. When voltage is initially applied to the circuit, transistor Q1 is on due to the forward bias provided through resistor R4, and transistor Q2 is off due to the reverse bias provided through resistor R5. With transistor Q1 on, capacitor C1 charges from −20 volts to ground through resistor R6, resistor R3, and the base-emitter junction of transistor Q1. When capacitor C1 is fully charged, it has no effect on the state of the circuit as long as transistor Q1 is on. When a positive pulse comes in at point A it is passed by diode CR1 and turns off transistor Q1 provided the pulse has enough amplitude to override the −0.35-volt level present at the base.

When transistor Q1 goes off, its collector goes to approximately −19 volts. This potential is coupled to the base of transistor Q2 through the cross-coupling resistor R2, causing transistor Q2 to come on. Lead $\overline{Q1}$ goes to the base of a solenoid driver transistor. Transistor Q2 conducts through the base-emitter junction of the driver transistor to ground. With transistor Q2 on, the negative potential at its collector is switched common to its emitter and is present at the base of the solenoid driver transistor, causing it to go on. When transistor Q2 comes on, its collector approaches ground, thus referencing the charge on capacitor C1 to ground. The positive side of capacitor C1 is now +20 volts with respect to ground. Capacitor C1 now attempts to discharge and recharge to −20 volts through resistor R4 from the emitter-base junction of transistor Q2 and the emitter-base junction of the solenoid driver transistor. When the capacitor passes through zero potential and begins to accumulate a negative charge, it turns on transistor Q1.

When transistor Q1 conducts, its collector approaches ground, allowing the +5-volt bias through resistor R5 to turn off transistor Q2. The time involved for capacitor C1 to discharge to zero volt and to accumulate enough negative charge to turn on transistor Q1 is determined by the value of resistor R1 and the value of C1. This R-C time determines the duration of the output pulse on lead Q1.

COUNTER OR DIVIDER: FIGURE 7, block M shows a counter stage. It is also a divider stage when used to divide down the output of the keyboard frequency standard. When voltage is initially applied to this circuit, one of the transistors will conduct due to circuit value imbalance. Assuming transistor Q1 conducts, its collector is at −0.15 volt with respect to ground. This potential is present through resistor R2 at the anode of diode CR1. Since transistor Q2 is off, −10.5 volts is present at its collector and this potential is present through resistor R8 and at the anode of diode CR2.

When a positive pulse comes in at point S, it passes through capacitor C1 and capacitor C2. Since diode CR2 has a large negative potential at its anode, it blocks the pulse. Diode CR1 passes the positive pulse, provided the pulse is large enough to override the −0.15 volt present at the anode. In order to turn off transistor Q1, the pulse must also be of sufficient amplitude to override the −0.35-volt potential at the base of transistor Q1. When transistor Q1 turns off, its collector goes to approximately −10.5 volts due to the 1.5-volt drop across resistor R1. This 1.5-volt drop is due to the small current from −12 volts through resistor R1, resistor R3, and resistor R5 to +5 volts. The base of transistor Q2 is now at approximately −5.6 volts and therefore turns on. With transistor Q2 on, its collector is at −0.15 volt and the collector of transistor Q1 is at −10.5 volts. This minus voltage is present through resistor R2 and is at the anode of diode CR1. The −0.15 volt at the collector of transistor Q2 is present through resistor R8 and is at the anode of diode CR2.

The next positive pulse at point S will be blocked by diode CR1 and passed by diode CR2. Transistor Q2 now goes off and transistor Q1 comes on. Successive positive pulses at point S will trigger transistor Q1 and transistor Q2 alternately.

FREE-RUNNING MULTIVIBRATOR: FIGURE 7, block N shows an astable of free-running multivibrator that is used as a timing standard when extreme accuracy is not required. When the supply voltage is present and provided point A is at ground potential, the multivibrator will start to cycle. Component value tolerances are such that there will be an imbalance, enough such that one transistor will conduct first. Assuming transistor Q1 conducts first, capacitor C2 will charge through resistor R4 and the base-emitter junction of the transistor Q1. Capacitor C2 charges to the potential at the base of transistor Q1 which is approximately −0.35 volt with respect to ground. Since capacitor C1 has discharged any potential it may have accumulated, the negative potenial through resistor R2 turns on transistor Q2. With transistor Q2 on, capacitor C1 charges through resistor R1 and the base-emitter junction of transistor Q2. Capacitor C2 is now discharging through resistor R3 and transistor Q2. Capacitor C1 charges to the potential at the base of transistor Q2 which is approximately −0.35 volt with respect to ground, allowing the negative potential through resistor R3 to turn on transistor Q1. This cycle repeats itself as long as voltage is applied and A is at ground potential. If ground potential is removed from A, transistor Q1 will be off and transistor Q2 will conduct until point A is returned to ground, allowing the cycle to continue.

EMITTER FOLLOWER: FIGURE 7, block P shows an emitter follower circuit. Transistor Q1 is normally off due to the +5 volts reverses bias on its base. A logic 0 level applied to input lead A turns transistor Q1 on in series with a driving transistor in the following stage. (See the ribbon lift driver circuit on FIGURE 12.) Since the emitter of transistor Q1 is now close to ground potential through the following stage, the output on lead T is actualy negative-going (from +5 volts to 0 volt). Therefore, the circuit is an emitter follower in that a negative input produces a negative output.

*Keyboard logic*

CHARACTERS TYPED AT LINE SPEED OR LESS READ DELAY: Refer now to logic diagram FIGURE 8 and timing chart FIGURE 9. For each character typed, the universal bail (U-bar switch 148) contacts provide a negative read pulse which turns on a transistor Q1. A positive-going output pulse from transistor Q1 sets the counter input gate register 210 through a pedestal gate P2. A positive-going transition on the logic 1 output of the counter input-gate register 210 sets the read delay register 220 (transistors Q9, Q10) through pedestal gate P6. After 7 ms., the read delay one-shot 220 provides a positive output pulse which gates the typed character into the five stages of the keyboard parallel register group 218. This delay insures that any vibration in the reed switch contacts will die down before the ground potentials provided through the reed code switches 146*a* through 146*e* are used to permutatively set the desired registers in register group 218.

KEYBOARD LOCK: The same positive-going transition which triggers the read delay one-shot 220 also sets the keyboard lock register 222 through a pedestal gate P3. A positive output from this lock register 222 turns off transistor Q6 which in turn allows a keyboard lock high power driver transistor Q1 to turn on and energize the keyboard locking solenoid 230.

COUNTER START: With the counter input gate 210 in the set condition, the positive output level on the 1 side conditions a pedestal P10 (see center of FIGURE 8) to pass positive output pulses from the constantly running frequency divider 224. The pulses step the low-speed 3-stage keyboard counter 226 to allow it to gate the registered character from register 218 onto the outgoing line. FIGURE 9 depicts a situation where the counter 226 is not started until after the 7-ms. delay from read delay one-shot 220, but it is just as probable that the counter 226 will be started before the delay ends. This would not present a problem since the start pulse sent to the outgoing line is always the same, does not depend on which character has been typed, and requires 13.3-ms. which assures the 7-ms. delay will be completed before the code bits from register 218 are permitted to transfer to the low speed counter 226.

SENDING A CHARACTER: Under control of the selected one of the tuning fork frequency standards 232, the frequency divider 224 steps the keyboard low-speed counter 226 at the bit speed of the outgoing line. In the reset condition, the first stage A of counter 226 is in the 0 condition. Therefore, a negative level is available on leads $A_1$, $B_0$, and $C_0$. Negative levels are used to prepare the parallel to serial OR gates 227 (OR11 through OR16) to gate the registered character from register 218 onto the line.

Spaces rather than marks are registered in the parallel register group 218. When a typing key is depressed, one of the code bail switches 146*a* through 146*e* closes for each space in the Baudot code of the character. The read delay one-shot 220, after its 7-ms. delay, gates the space indications of the code bail switches into the five stages of the parallel register group 218. Therefore, each space in the character code is represented by a set stage. Since parallel to serial OR gates 227, OR11 through OR16, require all but one negative input to provide a positive-going output transition, the logic 0 output sides of the five parallel register stages are wired to the OR gates 227. For example, if the first code element is a space, register 218 stage A (transistors Q1, Q2) is set to the 1 condition, and the 0 output lead provides a negative input to gate OR12. Similarly, if the second code element is a mark, the register 218 stage B (transistors Q3, Q4) remains in the 0 condition, and the 0 output lead provides a positive input to gate OR13.

As the first pulse from the frequency divider 224 steps the keyboard low-speed counter 226 once, the first counter stage A changes to the 1 condition. This provides a positive-going transition on the 1 output lead which causes the second counter stage B to change to the 0 condition. Negative outputs are now available on counter leads $A_0$, $B_1$ and $C_0$, allowing parallel to serial start gate OR11 to supply a negative level input to gate NAND 1. Any one negative input to gate NAND 1 causes it to provide a positive level output which turns off transistor Q21. The 1200-cycle, free-running multivibrator 234 is kept running by ground potential supplied by the collector of transistor 321. With transistor 321 turned off by gate NAND 1, the multivibrator stops and 1200-cycles per second tone is no longer placed on the outgoing line. Lack of tone represents the start signal and continues until the counter is stepped a second time. The tone generator 234 (Q21 and MV), per se, is not part of this invention.

As the second pulse from the frequency divider 224 steps the counter 226 once, the first counter stage A changes back to the 0 condition, the second counter stage B remains in the 0 condition, and the third counter stage C remains in the 1 condition. Negative outputs are now available on counter leads $A_1$, $B_1$, and $C_0$, allowing parallel to serial gate OR12 to supply a negative level input to gate NAND 1 if the first code element registered is a space. A negative input to gate NAND 1 allows it to provide a positive level output to keep transistor Q21 off and the 1200-cycle multivibrator tone generator 234 in the off condition. If the registered code element is a mark, parallel to serial gate OR12 provides a positive output as do all the other parallel to serial input gates OR11, and OR13 through OR16. All positive inputs to gate NAND 1 cause it to provide a negative output which turns on the tone generator transistor Q21. With transistor Q21 on, the 1200-cycle multivibrator tone generator 234 turns on and supplies the required 1200-cycle marking tone to the outgoing line.

Succeeding pulses from the frequency divider 224 continue to step the low-speed counter 226 so that parallel to serial gates OR13, OR14, OR15, and OR16 successively have negative inputs from the counter. Each of these OR gates 227, which has a negative input from the corresponding stage of the parallel keyboard register group 218, provides a negative input to gate NAND 1, allowing the 1200-cycle multivibrator MV to turn off (no tone) and thus indicate a space on the line.

After the last code element is gated onto the line, the counter 226 is stepped again to the $A_1B_1C_1$ condition at the beginning of the stop pulse of the outgoing character. The positive-going transition on output lead $C_1$ resets the first stage A of the counter 226 through gates P37 and P34. The extra step returns the counter 226 to the reset condition, ready for another character. The positive pulse on lead $C_1$ also triggers the counter input gate reset (1-ms.) delay one-shot 228. Further, the positive pulse on lead $C_1$ resets the playback time base gate 236 (upper right hand corner of FIGURE 8).

As the reset delay 228 is first triggered, the positive-going transition on the logic 1 output lead resets the counter input gate register 210 (upper left hand corner of FIGURE 8) via gate P8. As the reset delay 228 returns to its normal condition, it resets the parallel register group 218 via gates P16 through P20.

Referring back to the read delay one-shot 220 which gates the typed characted into the parallel register group 218, its positive output pulse resets the keyboard lock register 222 to allow another character to be typed on the keyboard. The positive level on the 0 output lead from keyboard lock register 222 prepares gate P8 for the subsequent trigger pulse from the reset delay (1-ms.) one-shot 228. The negative level on the keyboard lock register output 1 blocks gate P9 so that the pulse from reset delay 228 will not trigger the 7-ms. read delay 220.

*Character bursts typed faster than line speed*

To accommodate two-character high speed typing habit bursts, the keyboard lock mechanism 123 locks and maintains the code bails (by mechanism to be hereinafter described) set up by the second typed character locked until the preceding character is gated onto the outgoing line. This is accomplished electronically as follows.

When a character is typed before the preceding character is sent, the closed U-bar reed switch contacts 148 will have set the keyboard lock register 222 through gate P3. The counter input gate register 210 is already in the set condition and therefore provides a positive level to gate P3. Nothing more happens until the pulse from reset delay 228 triggers the 7-ms. read delay 220 through gate P9. Note that gate P8 now *will not* pass the reset delay pulse since the keyboard lock register 222 is in the set condition and thereby provides a negative blocking level to the gate P8.

As soon as the first character is gated onto the outgoing line, the 1-ms. reset delay 228 triggers the 7-ms. read delay one-shot 220. One (1) ms. after the 7-ms. read delay 220 is triggered, the reset delay 228 returns to its normal condition and in so doing resets the parallel register group 218 via gates P16 through P20. When the 7-ms. read delay 220 returns to its normal condition, it sets the parallel register group 218 via encoding switch gates P11 through P15, and resets the keyboard lock register 222 through gate P5, turning off the driver transistor Q1 and de-energizing lock solenoid 230.

REPEAT CHARACTERS: As long as the REPEAT key (to be described) on the keyboard and any typing key are held down simultaneously, the typed character is sent repeatedly as follows:

The depressed typing key causes the U-bar contacts 148 to close and turn on transistor Q1. Ground potential through transistor Q1 now sets the counter input gate register 210 and marks the contacts of REPEAT switch 320.

The closed REPEAT key switch 320 extends this ground potential from transistor Q1 to the level input of gate P10 through diode CR1 to allow the frequency divider 224 to run the low-speed counter 226 continuously. Also, the REPEAT key switch closes the ground potential to the level input of gate P9 to allow the reset delay 228 to trigger the read delay 7-ms. one-shot 220 after every countdown of the counter 226. Initially, the read delay one-shot 220 is trigged through gate P6 as the REPEAT key switch 320 is first operated.

After each 7-ms. read delay, the positive output pulse from the delay one-shot 220 gates the typed character into the parallel register group 218 via encoder switch gates P11 through P15. Both the counter input gate register 210 and the keyboard lock register 222 cycle once and then remain in the reset condition because no further positive pulses are available to set the counter input gate 210.

INHIBITING KEYBOARD TYPING: The recorder 108 during the SEND RECORD mode (as will be described under the following section on Recorder Logic) inhibits the normal effects of typing by closing a ground potential to lead SRK (see upper left of FIGURE 8) and through diode CR10 to prevent U-bar transistor Q1 from turning on so long as the inhibit signal prevails. Similarly, the recorder end-of-tape contacts will close a ground potential to lead EOTS (also upper left of FIGURE 8) and through diode CR9, keeping U-bar transistor Q1 off when the end-of-recorder-tape has been reached.

CHARACTER COUNTER: Each time the read delay one-shot 220 returns to the normal condition, through a diode CR12 and gate P7, it triggers the character counter 14-ms. delay one-shot 214 to turn on high power driver transistor Q2 and energize the counter solenoid 216 to cause the character counter 122 to advance one position. If the typed character is a non-printing, non-spacing one, a non-print character pulse switch 212 is closed to back bias the diode CR13 and thus prevent the read delay one-shot 220 from triggering the character counter one-shot 214. As explained in a later section, the character counter 122 indicates a maximum of 76 characters (necessary for a weather type of keyboard). Depression of the carriage return CAR RET key 316 (see FIGURE 1) triggers a mechanical release mechanism which returns the counter 122 to zero.

RECORDER SENDING: During the SEND RECORD mode, the low-speed 3-stage keyboard counter 226 is used to gate characters onto the outgoing line as the recorded character codes play back from the magnetic tape. The keyboard counter 226 is started by the recorder closing a ground potential to the IRST lead (upper right of FIGURE 8) through gate P35 to trigger the playback time base gate register 236. The resultant positive output level, on the logic 1 lead, conditions a gate P27 to allow pulses from the keyboard frequency divider 224 to step the low-speed 3-stage counter 226. At the end of the 3-stage counter 226 countdown, ground potential on counter 226 output lead $C_1$ resets the playback time base gate register 236 through a pedestal gate P36. The mode panel electronics circuitry provides ground potential on keyboard input lead RWS only during the SEND RECORD mode. This ground potential will condition gate P35 to allow pulses received from the recorder on lead IRST to set the playback time base gate register 236.

*Keyboard unit mechanics*

Keyboard unit 106 may be seen in FIGURE 1 secured to the front panel 126 of the Unit 1 drawer 113. The interior of the rear wall 156 (see FIGURE 11) of keyboard unit 106 provides a convenient mounting means for various components of the keyboard electronics such as the two, stacked printed circuit boards 152 and 154, the two high-power driver transistors Q1 and Q2 for the counter solenoid 216 and the keyboard lock solenoid 230 (see FIGURE 8), and various junction plugs and sockets such as P11, J11; P12, J12; P13, J13; and J16 providing electrical inter-connection between the keyboard and the various units in a set.

Keyboard unit rear wall 156 is placed flat against the vertical portion of unit 1 front panel 126 and against the seal strip 124 (FIGURE 10) and secured to that front panel by means of bolts and nuts. The main keyboard cover section 116 is secured to a base plate by screws and has a rear opening which enables the cover 116 to snugly fit over flanges on the rear wall 156, being hinged at its bottom corners to the bottom corners of the rear wall flanges and secured in assembly to its rear wall 156 by means of screws 117 (seen in FIGURE 1) which fit into threaded spacing bosses 158 seen in FIGURE 11. The main keyboard unit cover 116 mounts the mode selection panel 118 as a unit, the components of the recorder monitor panel 120, the character counter 122 and the mechanical keyboard structure 400. FIGURE 11 shows each of the keyboard unit components in assembled position as seen from the rear opening of keyboard cover 116. The mode panel unit 118 is secured to the keyboard unit cover 116 by screws so the indicator lights 134 and mode pushbuttons 132 (see FIGURE 1) are disposed on the exterior top right-hand side of the keyboard unit 106. Although the mode control panel structure is not specifically illustrated, each of the pushbuttons 132 seen in FIGURE 1 is disposed above its corresponding mode (S1 through S7) switch as described in connection with FIGURES 5A and 5B, and physically located immediately under the switches (S1–S7) are the nine mode relays K1 through K9, which are small sealed relays mounted in compact and adjacent alignment.

The character counter 122 is mounted on the lefthand side of the keyboard front cover 116 by screws so its indicator drum face is visible to the operator. The character counter 122 is a drum type counter with indices placed on the periphery of the drum, the drum 512 being rotatable past a pointer unit seen through the character counter window 127. The drum 512 is positively stepped by a solenoid 216, through a pawl and ratchet, against the bias force of an internal coil spring and is subsequently released by mechanical action from the keyboard, as will be described in more detail hereinafter.

*Primary keyboard structure*

The keyboard 400 includes the mechanical components to convert the mechanical shift of a depressed key or the space bar to a permutation of one or more switch contact closures. Each switch is a small glass encapsulated, magnetically controlled, reed switch. In the illustrated unit which has three rows of keys, depression of any key excepting the REPEAT key will generate, within the keyboard unit electronics, both a five-unit parallel and a seven-unit serial Baudot code signal. Thus, the keyboard unit can generate both serial and parallel output codes, as has been described with respect to the keyboard unit logic diagram FIGURE 8. Each depressed key 130 resulted in a control condition for five of the glass enclosed reed switches to provide a permutated arrangement of open or closed switches. A sixth glass enclosed reed switch 148 is provided and operates upon depression of any of the keys, being designated as the universal bar switch. Also, depression of the repeat key 150 closes a microswitch 320 permitting repeated sending of the character corresponding to any simultaneously depressed key 130 as has been explained in connection with the foregoing description of the keyboard logic diagram. A seventh glass enclosed, magnetically controlled reed switch 212 is closed upon depression of any key representing a non-printing and non-space function for character counter inhibiting.

Referring primarily to FIGURE 12, the mechanical keyboard structure includes right-hand and left-hand bearing plate assemblies 402 and 404, each of which has fastened to it by screws, an auxiliary code bail bearing plate 406 and 408. Plates 402 and 404 are mounted vertically upright and parallel at respective ends of a bottom plate 410 which has an elongate slot 412 passing along the middle and situated between the end plates 402 and 404.

Mounted between the end plates 402 and 404, disposed vertically above the bottom plate and in spaced apart relationship, are a plurality of key plates 414 (32 in the exemplary disclosure), which for convenience may be termed key levers. The basic outline of all key plates 414 is the same and, when initially fabricated, can be made with seven key cap tangs 416 projecting from the top edge. Referring to FIGURE 13, all key plates which carry key caps 130 to be located in the rear row of a three row keyboard use a tang such as **416*a* in position B; the plates for the middle row use a tang such as 416*b* in position D; and the plates for the front row use a tang such as 416*c*** in position F. The remaining six tangs on each basic key plate are removed. Note that the plates with tangs in positions B and F are identical but reversed.

The key plates 414, seen in FIGURE 12, are grouped in threes leaving a space between each group sufficient for a fourth plate. If additional key plates are used in the open spaces, a four row keyboard can be assembled, in which case, key cap tang positions A, C, E and G (shown in phantom line) would be used. Also the plate legs would have to be longer and additional code bails will be used.

Returning to FIGURE 13, each key plate 414 has three depending legs 417, 418 and 419. The side edges of legs 417 and 419 are vertical and straight, with legs 417 and 419 guided for vertical movement in slots in side combs 420 and 421 which are secured by screws at each end to tabs on the end plates 402 and 404. The center leg of each key plate 414 terminates in a downwardly extended guide and spring contact lug 420 which projects through the elongate slot 412 in bottom plate 410. A leaf spring plate 423 with multiple lateral fingers 424, at least one extending under an associated single key plate lug 420 and flexed to bias the associated key to its upward normal position, is fastened to the under side of bottom plate 410. The bottom guide lugs 420 of all key plates are guided by a comb 422 fastened on the underside of bottom plate 410 to underlap the elongate slot 412.

A key lever stop rod 430, with a rubber bumper strip 431, cemented in a groove along the top surface of rod 430, extends between and is rigidly fastened to each end plate 402 and 404. Stop rod 430 passes through a wide vertical slot 432 in the center of each key plate 414 and the upper non-operated position of each key plate, under the bias force of its associated spring leaf finger 424, is determined by abutment of the bottom edge of key plate slot 432 against the stop rod 430. The depressed operated limit position of each key plate 414 is determined by abutment of the top edge of slot 432 on the stop rod rubber bumper strip 431. In FIGURE 13 the key plate with tang **416*a* (which, for example, could be the letter R key plate) has been depressed and is against the rubber bumper strip 431. The key plates with tangs 416*b* and 416*c* immediately behind the first key plate 414 are not depressed. The hole beneath the slot 432 is merely a lightening hole. Clearly shown in FIGURES 19 and 20, but described relative to FIGURE 13, the inside edges of the key plate outer legs 417 and 419 are similarly notched to provide three overhanging shoulders on each leg and both sides of the middle leg 418 are similarly notched to provide three overhanging shoulders on each side edge. The shoulders on leg 419 are identified as "space" shoulders 433*s*, 434*s* and 435*s*, the shoulders on the side of center leg 418 which faces the right leg 419 are identified as "mark" shoulders 433*m*, 434*m* and 435*m*, the shoulders on the other side of the center leg 418 are identified as "space" shoulders 436*s*, 437*s* and 438*s*, and the shoulders on leg 417 are identified as "mark" shoulders 436*m* and 437*m* and "Universal" shoulder 438*u*. As will be shortly described, a universal bail (or U-bar) 440 is journalled between auxiliary end plates 406 and 408 at a level passing between the notches forming shoulders 438*s* and 438*u*, and only the shoulder 438*u* is used for the U-bar, shoulder 438*s*** being superfluous in this instance.

Besides the U-bar 440, five code bails 441, 442, 443, 444 and 445, which correspond respectively to the code bits 1–5 of a five-unit Baudot code, external between and are pivotally journalled in the auxiliary end plates 406 and 408. The journalled ends of each code bail 441–445 and the U-bar bail 440 are formed as round stub shafts 446 projecting through the auxiliary journal plates 406 and 408, and on one of the stub shafts 446 of each bail is secured a small permanent magnet 447 (see FIGURES 12, 14 and 15). Because all magnets and reed switches are similar, only one will be described. The magnets and reed switches are located adjacent end plates 402 and 404, the magnets which are adjacent end plate 402 being secured on bails 441, 443 and 445 and those adjacent the end plate 404 being secured on bails 442, 444 and 440 for convenience in spacing and overall arrangement. The reed switches have been previously designated in the keyboard logic diagram as code switches 146*a*, 146*b*, 146*c*, 146*d* and 146*e*, U-bar switch 148 and a non-count switch 212. All are actuated by a shift in magnetic lines of force of associated magnets 447, as will be described.

The glass encapsulated reed switches are mounted in one or the other of two dielectric switch assembly plates 450 or 452 spaced from and secured on the outer side of respective end plates 402 and 404 by spacers 453 and nuts and bolts. Seen in FIGURE 14, the glass switch capsules are located in grooves in the dielectric plates 450 and 452, the switch leads extending at 90° through the dielectric plates providing accurate location of each switch relative to its actuating magnet. The switch leads are secured to terminal lugs 454 to which the necessary wiring harness can be connected.

Turning to FIGURES 14 and 15 a glass encapsulated reed switch 146 is shown in the approximately correct relative relationship to the magnet 447. An idea of the size of the capsule may be determined by using 1″ as the distance between the bent parallel terminal leads which pass through the dielectric assembly plate 452. Such reed switches per se are commercially available. The reed contact strips 455 and 456 are made of iron, gold plated at the contact area and sprung very slightly out of contact.

The small rod magnets 447 are held rigidly in grooves 457, by triangle swages 458, in a non-ferrous ferrule 459 which is fastened on a stub shaft end 446 of one of the code-bails or U-bail. A slight rocking rotation of the ferrule 459 by pivoting the attached bail toward a "mark" position will change the flux path of the magnet to strengthen the flux passing through the reed switch contacts, moving the contacts to a closed or "mark" condition. Pivoting of a bail in the other direction to a space position, and thus changing the rotary position of the associated magnet will cause the associated reed switch contacts to open. The movement of the reeds is minute, the voltage through the switches is low and current is very low, hence the switch life far exceeds the life expectancy of the equipment.

Returning now to FIGURE 13, if a key 130 for a specific character or machine function is depressed it is necessary that the key plate depression be transferred to a mechanically coded condition of the code bails 441, 442, 443, 444 and 445. This is accomplished by discrete notching of one side or the other of the code bails depending upon whether the associated reed switch is to be closed or opened by that key depression representing either a mark or space bit in the code being used. For example, if the character of the depressed key is "R" (S–M–S–M–S), as is used for the condition represented in FIGURE 13, the bails must be notched as follows: code bails 441, 443 and 445 are notched at a location where they respectively extend below the key plate mark shoulders 443*m*, 435*m* and 437*m*, however the exact opposite side of each of bails 441, 443 and 445 is solid (not notched) so all three bails will be engaged by space shoulders 433*s*, 435*s* and 437*s* and pivoted to a space position (contacts open); code bails 442 and 444 are notched at a location where they respectively extend below the key plate space shoulders 434*s* and 436*s*, however the exact opposite side of each of bails 442 and 444 is solid (not notched) so each of these bails will be engaged by their associated mark shoulders 434*m* and 436*m* and pivoted to a mark position (contacts closed). All code bails are permutatively notched to be pivoted either to mark or space position in accord with the code representing the depressed key. The unnotched portions of the bails constitute lands, and the opposing lands and notches are complemental to each other.

One entire side of the U-bail 440, the side facing key plate shoulder 438*s* is removed, excepting for a spring tab 462, and the other side of the U-bail is solid passing under all key plate shoulders 438*u* excepting for a notch located under the "Repeat" key plate shoulder 438*u* for reasons which should be clearly apparent. Thus depression of any key 130 or space bar 460 (not repeat key 150) will set the five code bails 441–445 to the desired switch coding positions and will pivot the U-bail 440 to a position which closes U-switch 148.

By adjusting the fixed positions of the magnet holding ferrules 459 on the various bails the code switches 146*a*–146*e* will be actuated before the U-switch 148 is closed, assuring all code switches of "dry" operation, i.e., they are opened and closed in open circuits.

None of the code bails 441–445 are spring loaded, they have only two positions "mark" and "space" and stay in their last position until deliberately pivoted to the other position (as distinguished from known prior art pivoted type permutation code bails which are conventionally spring biased to a neutral position and use a mechanical interlock to prevent two-key burst operation).

Since the code bail 440 is operated once for each depressed coding key, it is spring biased to the non-operated position by a coil tension spring 461 which is anchored between a tab 462 on the end of the code bail 440 and an anchor pin fixed in the end plate 402.

At the lower rear of the keyboard is a non-count shaft 464 pivotally journalled in ears 465 of auxiliary end plates 406 and 408. This shaft 464 carries a magnet 447 and is used to actuate the non-count reed switch 212 in a similar manner as previously described for the other reed switches. Inasmuch as several of the keys are for code characters representing machine functions and no character spacing is desired for operations as a result of such key depressions, it is arranged that depression of any such key will engage a non-count shaft tab 446 (see FIGURES 13 and 16) secured by a screw to the shaft 464 adjacent the requisite key plate 414. The leading toe 467 of a non-count tab 466 projects under an outside shoulder 468 on rear leg 417 of the desired key plate 414 and when the key plate is depressed, the shoulder 468 will engage the associated tab 466 and pivotally rock the non-count shaft 464 so its magnet 447 will close the non-count switch 212, providing a signal used to prevent typed character counting and which can be used to prevent printing in a printer. In the exemplary embodiment, such tabs 466 are provided for FIGS, LTRS, LF (line feed) and CR (carriage return).

A similar shaft 470 for counter reset is pivotally journalled in front ears 471 on auxiliary end plates 406 and 408 and includes one tab 473 disposed under an outside shoulder 474 on the front leg 419 of the CR key plate 414. Counter reset shaft 470 is spring loaded to its non-operated position by coil spring 475 and has one projected end 476 which extends to adjacent the character counter 122. Rigidly fastened to the end of reset shaft 470 by a set screw is a reset lever 476 with two fingers 477 and 478. When pivotally shifted by depression of the CR key plate the lever 476 will reset the character counter 122, as will be described hereinafter.

Seen in FIGURES 13 and 17, the repeat micro-switch 320 is mounted on the front comb 420, by screws, adjacent the repeat key plate 414*r*. A flat operator plate 480 with a depending bent lug 481 is riveted along the upper edge at the side of the repeat key plate 414*r* and projects forward over the actuating button of the repeat switch 320 so that depression of the repeat key 150 and its plate 414*r* will close the repeat switch 320.

The "Repeat" key plate 414*r* does not operate the code bails 441–445 or the U-bar code bail 440 but only closes the snap action "Repeat" micro-switch 320 which permits repeating of any other typed character by keeping the desired key 130 or space for 460 depressed.

A "space" bar 460 (see FIGURES 2 and 12) operates a "space" plate 484 through linkage best shown in FIGURES 18–20. The space plate 484 is located at the far righthand side of the key plates 414 and is basically similar in shape to the aforedescribed key plates 414 but all tangs have been removed from its upper edge. Instead a headed stud 485 is riveted to the side at the front upper corner of the space plate 484 and receives a forwardly projected forked end 486 of a lever 487 the other end of which is secured to a spacing, pivot shaft 488 which is pivotally journalled between the upper rear corners of end plates 402 and 404. Lever 487 is rigidly fastened, as by spinning, to a collar 489 which in turn is adjustably fastened by set screws to shaft 488, rocking of which will pivot the lever 487 and depress the space plate 484. Two similar shaped operating levers 490 and 491 with secured collars 492 and 493 are adjustably fastened in spaced apart relationship on the rockable space shaft 488 and extend forward between two sets of adjacent key plates 414, e.g., between the "C" and "R" key plates and between the "M" and "I" key plates, to a position in front of all key plates where each lever terminates in an upwardly extended tang respectively, **494*a* and 494*b* similar in shape to the key plate tangs 416. The space bar 460 is pressed on the two space lever tangs 494*a* and 494*b* in a conventional manner, so that depression of the space bar 460 will rock the pivot shaft 488 and through lever 487 depress the space plate 484 to operate desired code bails 441–445 and the U-bail 440, as hereinbefore described for the key plates 414**.

Inasmuch as the disclosed embodiment is weatherproofed, a flexible rubber diaphragm 495, bonded to a metal frame 496 (see FIGURE 12), is secured by screws to the keyboard cover 116 over the keyboard mechanism and has pierced slots to pass over each of the space bar tangs **494*a* and 494*b* and all key plate tangs 416. Before installing the diaphragm cover 495 a small metal washer 496 (see FIGURE 19) is placed on each tang and after installing the diaphragm cover 495, a thick soft rubber washer 497 is placed on each tang to provide a seal between the space bar 460 and all key caps 130 and 150, the slotted tang and the upper surface of diaphragm cover 495. There is sufficient excess material in the thin diaphragm 495** so as to offer no interference to the operational depression of the keys.

If weatherproofing is not necessary, the washers 496 and 497 and the diaphragm 495 can be replaced by a thin sheet of pierced material (not shown) secured to the keyboard unit cover 116.

The level of all keys above the key plates 414 is the same and the inclined aspect, apparent in FIGURE 1, is derived by mounting the keyboard mechanism 400 in an inclined position inside the keyboard unit cover 116 to match the inclination of the cover upper surface.

Referring now to FIGURES 12 and 21, the keyboard locking mechanism 123 will be described. As a key 130 or space bar 460 on the keyboard 400 is depressed, the keyboard electronics momentarily energizes locking solenoid 230 for 5 to 8 ms. When energized, the locking solenoid plunger 425 moves a bell crank lever 426 to shift a keyboard locking plate 427 rearwardly to lock the five code bails 441–445 and thus momentarily prevent movement of the key plates. For normal single key depression the 5 to 8 ms. time has no effect on operation because the code bails are unlocked within the period while the key is still depressed; however, for two key burst speeds the second code bail selection will be held in locked position until the second coded positions of the reed switches have been accepted and registered in the keyboard electronics for transmission.

Locking solenoid 230, as shown in FIGURE 21, is mounted on an ear 428 of the keyboard end plate 404 with its plunger 425 extending downwardly. In the end of the solenoid plunger 425 is a cross pin 429 which engages a forked arm 498 of the bell crank lever 426 which is pivoted on a pin mounted in end plate 404. The other arm 499 of the bellcrank 426 extends upwardly on the inside of end plate 404 and interlocks with a notch 500 in the lower edge of the lock plate 427. Thus, upward movement of plunger 425, when solenoid 230 is energized, will result in the interlocked bellcrank arm 499 shifting the lock plate 427 rearwardly.

Lock plate 427 has a rearwardly disposed flat upper bar which is slotted in three places to fit over and slide fore and aft in a straight path on the key stop rod 430, the space bar rock shaft 488 and a stud post 501 fixed to the upper front inside corner of end plate 404. Collars, secured on the rock shaft 488 and stud post 501, slidably maintain the lock plate 427 and washers (not shown) against the end plate 404. A coiled tension spring 502 is anchored between the lock plate and the end plate to bias the lock plate to its forward non-locking position.

Two fingers 503 and 504 depend from the lock plate 427 in front of the two vertical groups of bails 440–445. Finger 503 has three wedge shaped lock lugs 505 projecting toward respective code bails 441, 442 and 443 and finger 504 has two wedge shaped lock lugs 506 extending toward code bails 445 and 444. There is no lock lug for the U-bail 440. All code bails 441–444 have a solid finger which projects toward and is aligned with an associated lock lug 505 or 506. When the bails are in "space" position (bails 441, 443 and 445), a rearwardly sliding operative movement of the lock plate 427 will cause an associated lock lug 505 or 506 to overlay and hold the bails against movement out of the "space" position. Also if the code bails are in "mark" position (bails 442 and 444) the associated lock lugs 505 and 506 will slide under the bail projections and lock such bails in "mark" position. In an unlocked condition of the lock plate 427 the locking lugs 505 and 506 are positioned at rest forward of and do not interfere with the pivotal movement of the code bails.

CHARACTER COUNTER: The character counter 122 (see FIGURES 1, 2, 11 and 12) consists of a counter solenoid assembly 216, bell crank 510, drive pawl 511, drum indicator wheel assembly 512, counter reset lever 476, detent pawl 513, and detent pawl latch 514, all mounted in a support bracket 515. The keyboard electronics will function to advance the counter wheel one position each time a printing or spacing key is depressed, and accomplishes this action by energizing the counter solenoid 216. In being energized the counter solenoid 216 moves its plunger 516 to engage and pivot the bell crank 510. Bell crank 510 carries a spring biased, pivotally mounted pawl 511 and when pivoted will drive pawl 511 clockwise into the counter ratchet 517 of the drum indicator wheel assembly. A counter scale (see FIGURE 2) on the indicator wheel drum periphery advances only one index position, inasmuch as an angle lug 518 on bracket plate 515 in the path of the pawl 511 will limit the pawl stroke to one tooth advancement of the counter ratchet 517. Either before or when the counter indicator reaches the index number 72, for a communication keyboard or 76 for a weather keyboard, the CAR RET key may be depressed by the operator. The CAR RET key plate 414 engages tab plate 471 (FIGURE 13) fastened to counter reset shaft 470. Reset lever 476 on one end of reset shaft 470 has a short finger 478 which abuts and disengages the ratchet detent pawl 513 to allow a coiled storage spring inside the indicator wheel assembly 512 to drive the counter back to the zero position. When the detent pawl 513 is shifted to disengaged position by reset lever 476, a notched foot 519 on the detent pawl rides over and latches on a lug 520 of spring biased detent pawl latch 514. When the counter wheel drum spins back to zero position, a stud 521 in the drum body abuts an upwardly projected lever finger 514 on detent latch 514 and shifts the latch clockwise to release the detent pawl 513 and permit it to return to its operative position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A keyboard transmitter comprising: manipulative mechanical keyboard structure and transmission components controlled thereby, said keyboard structure including: a plurality of shiftably depressible key levers; a plurality of longitudinally pivoted code bails with cooperating portions of said key levers and code bails including abutments and permutatively arranged notches enabling positive engagement between each depressed key lever and all code bails to provide operation of each of said code bails to and retention in either one of only two pivotal positions, upon actuation of a key lever, representative of a mark, or a space condition, said pivotally positioned code bails thereupon providing a specific permutation code corresponding to the character on said depressed key lever; a universal bail invariably engaged by and operated upon depression of any key lever; a plurality of on-off switches, each corresponding to an associated one of said code bails and set to an on or off condition upon positioning of said code bails by a depressed key lever; and a U-bar switch invariably closed subsequent to setting of said code switches by operation of said universal bail.

2. A keyboard transmitter as defined in claim 1, wherein:

said key levers are vertically parallel and independently shiftable key plates obtained from identical basic stampings having a plurality of key cap tangs spaced apart along their upper edge, each plate in desired different alternating groups of said key plates retaining only one of said key cap tangs with the tangs of said different groups being located in different positions along the top edge of said plates to enable a plurality of rows of keys on said keyboard.

3. A keyboard transmitter as defined in claim 2, comprising:

(a) a data signal code communication set mode conditioning panel and associated circuitry means secured to said keyboard structure adjacent said key levers enabling the operator of said keyboard transmitter unit to:

(1) receive messages on an associated printer, (2) send messages from said keyboard to an outgoing line, (3) store messages from said keyboard in a magnetic tape recorder unit, at the same time to monitor such transmitted message on a printer, or (4) control playback of a recorded message from a recorder into said electronic parallel and serial code circuitry of said keyboard electronics for transmission to an outgoing line and simultaneously enable monitoring of such recorder transmitted message by the monitor printer.

4. A keyboard transmitter as defined in claim 3, comprising:

a keyboard unit cover with means sealing said entire keyboard unit in a weatherproofing condition including:

a thin rubber-like diaphram having a plurality of pierced openings fitting over all of said key tangs and clamped in a sealed relationship to said cover, and means carried on each of said key tangs clamped in sealed relationship to said diaphragm adjacent the pierced opening through which an associated tang projects to the exterior of the keyboard unit.

5. A keyboard transmitter comprising: manipulative keyboard and transmission components controlled thereby, said keyboard structure including: a plurality of shiftably depressible key levers; a plurality of elongate code bails with means mounting said code bails for pivotal movement about their longitudinal axis; each said key lever including a plurality of abutments corresponding to every code bail and predetermined ones of said abutments being adapted to engage associated code bails on one side or the other side of the code bail longitudinal pivot axis enabling each depressed key lever to accomplish operation of all code bails so that each code bail is positioned to and maintained in one or the other of two pivotal positions; a plurality of on-off switches, each set to one of their two conditions corresponding to an associated one of said code bails and its positioning by a depressed key lever; a U-bar switch invariably closed subsequent to setting of said code switches by operation of said universal bail; all of said switches being glass encapsulated, reed contact switches; and a permanent magnet secured on an end of each of said code bails and said universal bail with its pole axis transverse to the direction of the associated bail axis and disposed so the magnets remain closely adjacent their respective switches and all of which magnets are positionable and held in either one of two positions so their magnetic flux path is disposed in one of two directions relative to the disposition of the reed and thereby causes an opened or closed position of said reed contact switches depending upon which selected key lever is depressed.

6. A mechanical encoding keyboard structure comprising:

a plurality of key levers, a group of elongate longitudinally pivoted two-position permutatively notched code bails having no neutral position, the angular position of each code bail constituting one of two signals in each bit of a multiple bit signal combination, the side of each code bail directly opposite a notch being unnotched to provide an abutment edge, and means enabling mechanical positioning and retention of all said code bails in a permutational arrangement by a depressed selected key lever cooperating with notches in one or the other side of said code bails and abutment edges on the sides of said code bails opposite the notches.

7. A keyboard structure as defined in claim 6 further comprising: means transferring such mechanical code bail positioning into an on-off electrical switch, code combination.

8. A keyboard structure as defined in claim 7, wherein:

the means for transferring said mechanical permutative position conditioning of said code bails into an electrical switch code combination comprises:

a magnetically operated reed switch for and associated with each code bail, and a permanent magnet secured to each code bail closely adjacent the associated said reed switch and pivotable with said associated code bail to two positions, one of which causes a magnetic flux path to close said reed switch and the other of which causes a magnetic flux path to open said reed switch.

9. A keyboard encoder comprising:

a plurality of character representing keys;

a plurality of on-off code switches operated in permutational order upon depression of a selected key and corresponding to a code representation of the character of that selected key, each of said switches comprising:

a glass enclosed reed contact, magnetically actuated switch;

a plurality of switch operating magnets, one for each of said switches, positionable in one of two positions so their magnetic flux causes an opened or closed position of said reed contact switches depending upon which selected key lever is depressed; and means cooperating between any selected key and said magnets enabling positive positioning of all said magnets to and retention of all said magnets in one of said two positions upon depression of any key.

10. A keyboard as defined in claim 9, comprising:

(a) electronic transmission means responsive to a closed universal bail switch to read out the signal represented by the permutation of said operated reed contact switches to result in a parallel and serial readout of the encoded signals to associated keyboard electronic transmission means which includes:

(1) electronic means for blocking repeated transmission of the same signal if that selected key is maintained depressed.

11. A keyboard as defined in claim 10, wherein:

(a) a repeat key is provided on said keyboard, and (b) means operated by depression of said repeat key include an electric circuit to said electronic repeat blocking means to electronically inhibit the repeat blocking function and permit repeated signals of any print key which is maintained in a depressed condition.

12. A keyboard transmitter comprising a plurality of key levers and permutationally operable code elements having opposed actuatable edges cooperating therewith, said key levers including operating means arranged along opposite edges of said code elements, and said code elements having distinctive configurations on each of said edges, the configurations on one edge being in complemental relation to the configurations on the other edge.

13. A device according to claim 12, wherein said code elements are flat, elongated plates, and the configurations therein are comprised of lands and notches, each of said plates being pivoted about an axis through the longitudinal center thereof, and wherein the operating means on each of said key levers comprises abutments which engage lands on either of the edges of said plates, the notches directly opposite said lands providing clearance for plate pivoting movement.

14. A device according to claim 13, wherein the code plates function as flip flop devices, having but two alternate effective positions and wherein said plates actuate switch operating means for transforming the code on the plates from mechanical to electrical form.

15. A keyboard transmitter encoder comprising a plurality of on-off code switches each of which is operated to one or the other condition upon depression of a selected key whereby the combination of "on" or "off" conditions of said switches corresponds to a code representation of the character of that selected key, each of said switches comprising, a glass enclosed reed contact, magnetically actuated switch; and a plurality of switch operating magnets, one for each of said switches, disposed so the magnets remain closely adjacent their respective switches and all of which magnets are positionable and held in either one of two positions so their magnetic flux path is disposed in one of two directions relative to the disposition of the reed contacts and thereby causes an opened or closed position of said reed contact switches depending upon which selected key is depressed.

16. A keyboard transmitter unit comprising: a plurality of symbol representative key levers each of which has an upwardly projecting key tang thereon; desired different alternating groups of said key levers having said tangs located in different positions to provide a plurality of rows of key receiving tangs on said keyboard unit; a keyboard unit cover; and means sealing said entire keyboard unit in a weatherproofing condition including: a thin rubber-like diaphragm having a plurality of pierced openings fitting over all of said key tangs and clamped in a sealed relationship to said cover and means carried on each of said key tangs clamped in sealed relationship to said diaphragm adjacent the pierced opening through which an associated tang projects to the exterior of the keyboard unit.

17. A keyboard encoder comprising: a plurality of key operated code bails; a plurality of on-off code switches operated in permutational order by said code bails upon depression of a selected key and corresponding to a code representation of the character of that selected key, each of said switches comprising: a glass enclosed reed contact, magnetically actuated switch; and a plurality of switch operating magnets, one for each of said switches, positionable in one of two positions so their magnetic flux causes an opened or closed position of said reed contact switches depending upon which selected key lever is depressed; and an automatic electronic control permitting a two-character typing burst, the speed of which exceeds a permitted line transmission rate, said automatic control comprising: a mechanical keyboard bail locking mechanism operable through a delay electronic circuitry in said electronic control for engaging said code bails and holding the second character of the two-character burst in mechanical storage in the keyboard code bails until the first selected character has been transmitted through the electronic transmission circuitry.

18. A keyboard transmitter comprising: a plurality of key levers; permutationally operable code elements having opposed actuatable edges; and switch operating means, actuated by said code elements for transforming the code on the plates from mechanical to electrical form; said key levers including operating means arranged along opposite edges of each of said code elements, and said code elements having distinctive configurations on each of said edges, the configurations on one edge being in complemental relation to the configurations on the other edge, said code elements being flat, elongated plates, and the configurations therein comprising lands and notches, each of said plates being pivoted about an axis through the longitudinal center thereof; the operating means on each of said key levers comprises abutments, individual ones of which engage lands on either of the edges of said plates, the notches directly opposite said lands providing clearance for plate pivoting movement; said code plates function as bi-stable flip flop devices, having but two alternate effective pivoted positions and retaining the combinational setting caused by the last operated key lever until a subsequent key lever operation is initiated, and the structural cooperation between said plates and said key lever operating means serves to prevent simultaneous depression of more than one key lever.

References Cited by the Examiner

UNITED STATES PATENTS

| | | | |
|---|---|---|---|
| 2,124,160 | 7/1938 | Wheelock | 340—365 |
| 2,754,364 | 7/1956 | Kleinschmidt et al. | 178—79 |
| 2,932,816 | 4/1960 | Stiefel et al. | 178—79 |
| 3,109,071 | 10/1963 | Mitchell et al. | 179—90.3 |
| 3,129,302 | 4/1964 | Postel | 200—87 |

OTHER REFERENCES

German printed application 1,082,629, to Oden, June 2, 1960.

IBM Technical Discl. Bull., vol. 4, No. 8, January 1962, page 15, Magnetic Keyboard, by Dixon.

NEIL C. READ, *Primary Examiner.*

T. A. ROBINSON, *Assistant Examiner.*